(12) United States Patent
Weisman

(10) Patent No.: US 11,971,909 B2
(45) Date of Patent: Apr. 30, 2024

(54) DATA PROCESSING SYSTEM WITH MANIPULATION OF LOGICAL DATASET GROUPS

(71) Applicant: Ab Initio Technology LLC, Lexington, MA (US)

(72) Inventor: Amit Weisman, Bedford, MA (US)

(73) Assignee: Ab Initio Technology LLC, Lexington, MA (US)

(*) Notice: Subject to any disclaimer, the term of this patent is extended or adjusted under 35 U.S.C. 154(b) by 0 days.

(21) Appl. No.: 17/589,016

(22) Filed: Jan. 31, 2022

(65) Prior Publication Data
US 2022/0245176 A1    Aug. 4, 2022

Related U.S. Application Data

(60) Provisional application No. 63/163,699, filed on Mar. 19, 2021, provisional application No. 63/143,924, filed on Jan. 31, 2021.

(51) Int. Cl.
*G06F 16/28* (2019.01)
*G06F 16/215* (2019.01)
(Continued)

(52) U.S. Cl.
CPC ......... *G06F 16/287* (2019.01); *G06F 16/215* (2019.01); *G06F 16/248* (2019.01); *G06F 3/0482* (2013.01)

(58) Field of Classification Search
None
See application file for complete search history.

(56) References Cited

U.S. PATENT DOCUMENTS

| 5,615,325 A | 3/1997 | Peden |
| 5,630,127 A | 5/1997 | Moore et al. |

(Continued)

FOREIGN PATENT DOCUMENTS

| EP | 2 221 733 A1 | 8/2010 |
| EP | 2 657 860 A1 | 10/2013 |

(Continued)

OTHER PUBLICATIONS

International Search Report and Written Opinion for International Application No. PCT/US2022/014547 dated Mar. 29, 2022.

(Continued)

*Primary Examiner* — Kim T Nguyen
(74) *Attorney, Agent, or Firm* — Wolf, Greenfield & Sacks, P.C.

(57) ABSTRACT

A data processing system that receives user input specifying datasets on which operations are performed with user interfaces that enable manipulation of hierarchical groups of datasets. A user interface may enable individual datasets or a previously defined group of datasets to be aggregated into another grouping. The groupings may be scoped, including by persona of users, such that, when a user is prompted to specify one or more datasets as a target of an operation by the data processing system, the available choices are limited to datasets that have a scope encompassing that user. The interfaces may prompt a user to select a grouping within the hierarchy that contains datasets on which the operation can be performed. Upon selection of a grouping with multiple datasets as a target of an operation that is performed on datasets singly, the operation may be performed on each dataset in the selected group.

21 Claims, 26 Drawing Sheets

(51) Int. Cl.
*G06F 16/248* (2019.01)
*G06F 3/0482* (2013.01)

(56) References Cited

U.S. PATENT DOCUMENTS

| | | | |
|---|---|---|---|
| 5,966,072 A | 10/1999 | Stanfill et al. | |
| 6,088,702 A | 7/2000 | Plantz | |
| 6,314,424 B1 | 11/2001 | Kaczmarski et al. | |
| 6,438,741 B1 | 8/2002 | Al-omari et al. | |
| 6,494,159 B2 | 12/2002 | Sirmalis et al. | |
| 6,948,154 B1 | 9/2005 | Rothermel et al. | |
| 7,047,232 B1 | 5/2006 | Serrano | |
| 7,080,088 B1 | 7/2006 | Lau | |
| 7,110,924 B2 | 9/2006 | Prewett et al. | |
| 7,164,422 B1 | 1/2007 | Wholey, III et al. | |
| 7,167,850 B2 | 1/2007 | Stanfill | |
| 7,661,067 B2 | 2/2010 | Chen et al. | |
| 7,689,565 B1 | 3/2010 | Gandhi et al. | |
| 7,716,630 B2 | 5/2010 | Wholey et al. | |
| 7,765,529 B1 | 7/2010 | Singh et al. | |
| 7,840,949 B2 | 11/2010 | Schumacher et al. | |
| 7,853,553 B2 | 12/2010 | Lankinen et al. | |
| 7,895,586 B2 | 2/2011 | Ozone | |
| 7,979,646 B2 | 7/2011 | Furtek et al. | |
| 8,069,129 B2 | 11/2011 | Gould et al. | |
| 8,195,643 B2 | 6/2012 | Weyerhaeuser et al. | |
| 8,423,564 B1 | 4/2013 | Hayes | |
| 8,516,008 B1 | 4/2013 | Marquardt et al. | |
| 8,484,159 B2 | 7/2013 | Stanfill et al. | |
| 8,793,243 B2 | 7/2014 | Weyerhaeuser et al. | |
| 8,838,579 B2 | 9/2014 | Weyerhaeuser et al. | |
| 9,116,955 B2 | 8/2015 | Schechter et al. | |
| 9,158,797 B2 | 10/2015 | Stanfill et al. | |
| 9,208,141 B2 | 12/2015 | Chan et al. | |
| 9,798,527 B1 | 10/2017 | Bendersky et al. | |
| 9,977,659 B2 | 5/2018 | Larson et al. | |
| 9,977,831 B1 | 5/2018 | Raichur et al. | |
| 10,180,821 B2 | 1/2019 | Larson et al. | |
| 10,318,283 B2 | 6/2019 | Bach et al. | |
| 10,338,782 B2 | 7/2019 | Stanfill et al. | |
| 10,459,881 B2 | 10/2019 | Barth et al. | |
| 10,503,923 B1 | 12/2019 | Gupta et al. | |
| 10,528,599 B1 | 1/2020 | Pandis et al. | |
| 10,713,272 B1 | 7/2020 | Caldwell et al. | |
| 10,817,310 B2 | 10/2020 | Stanfill et al. | |
| 10,817,495 B2 | 10/2020 | Dickie | |
| 10,901,702 B2 | 1/2021 | Larson et al. | |
| 11,032,410 B2 * | 6/2021 | Ellis | G09G 5/005 |
| 11,188,434 B2 | 11/2021 | Allin et al. | |
| 11,288,258 B2 * | 3/2022 | Murphy | G06F 16/2456 |
| 11,341,155 B2 * | 5/2022 | Wakeling | G06F 16/24578 |
| 11,593,380 B2 * | 2/2023 | Schechter | G06F 16/24573 |
| 2001/0007959 A1 | 7/2001 | Abdalla | |
| 2001/0014890 A1 | 8/2001 | Liu et al. | |
| 2002/0161799 A1 | 10/2002 | Maguire, III et al. | |
| 2002/0194196 A1 | 12/2002 | Weinberg et al. | |
| 2002/0194314 A1 | 12/2002 | Kouznetsov et al. | |
| 2003/0016246 A1 | 1/2003 | Singh | |
| 2003/0041063 A1 | 2/2003 | Brady | |
| 2003/0154191 A1 | 8/2003 | Fish et al. | |
| 2003/0163441 A1 | 8/2003 | Godfredsen et al. | |
| 2003/0163512 A1 | 8/2003 | Mikamo | |
| 2003/0163597 A1 | 8/2003 | Hellman et al. | |
| 2004/0015783 A1 | 1/2004 | Lennon et al. | |
| 2004/0024740 A1 | 2/2004 | McGeorge, Jr. | |
| 2004/0056908 A1 | 3/2004 | Bjornson et al. | |
| 2004/0088318 A1 | 5/2004 | Brady | |
| 2004/0220942 A1 | 11/2004 | Agrawal et al. | |
| 2004/0225632 A1 | 11/2004 | Benson et al. | |
| 2004/0225682 A1 | 11/2004 | Murman et al. | |
| 2004/0239681 A1 | 12/2004 | Robotham et al. | |
| 2004/0250098 A1 | 12/2004 | Licis | |
| 2005/0010896 A1 | 1/2005 | Meliksetian et al. | |
| 2005/0060313 A1 | 3/2005 | Naimat et al. | |
| 2005/0060317 A1 | 3/2005 | Lott et al. | |
| 2005/0097561 A1 | 5/2005 | Schumacher et al. | |
| 2005/0114369 A1 | 5/2005 | Gould et al. | |
| 2005/0187984 A1 | 8/2005 | Chen | |
| 2005/0234762 A1 | 10/2005 | Pinto et al. | |
| 2005/0262121 A1 | 11/2005 | Cesare et al. | |
| 2005/0289167 A1 | 12/2005 | Haselden et al. | |
| 2006/0007464 A1 | 1/2006 | Percey | |
| 2006/0020570 A1 | 1/2006 | Wu | |
| 2006/0095466 A1 | 5/2006 | Stevens et al. | |
| 2006/0200739 A1 | 9/2006 | Bhatia et al. | |
| 2006/0282480 A1 | 12/2006 | Johnson et al. | |
| 2007/0011208 A1 | 1/2007 | Smith | |
| 2007/0011668 A1 | 1/2007 | Wholey et al. | |
| 2007/0027858 A1 | 2/2007 | Weinberg et al. | |
| 2007/0050750 A1 | 3/2007 | Bykov et al. | |
| 2007/0094060 A1 | 4/2007 | Apps et al. | |
| 2007/0136692 A1 | 6/2007 | Seymour et al. | |
| 2007/0179956 A1 | 8/2007 | Whitmyer, Jr. | |
| 2007/0198457 A1 | 8/2007 | Olenick et al. | |
| 2007/0220022 A1 | 9/2007 | Lankinen et al. | |
| 2007/0226203 A1 | 9/2007 | Adya et al. | |
| 2007/0239751 A1 | 10/2007 | Wei et al. | |
| 2007/0271381 A1 | 11/2007 | Wholey et al. | |
| 2007/0276787 A1 | 11/2007 | Piedmonte | |
| 2007/0294119 A1 | 12/2007 | Eicher et al. | |
| 2008/0049022 A1 | 2/2008 | Sherb et al. | |
| 2008/0126988 A1 | 5/2008 | Mudaliar | |
| 2008/0140622 A1 | 6/2008 | Bestgen et al. | |
| 2008/0162384 A1 | 7/2008 | Kleist et al. | |
| 2008/0201359 A1 | 8/2008 | Warshavsky et al. | |
| 2008/0228697 A1 | 9/2008 | Adya et al. | |
| 2008/0243772 A1 | 10/2008 | Fuxman et al. | |
| 2008/0243891 A1 | 10/2008 | Super et al. | |
| 2008/0256014 A1 | 10/2008 | Gould et al. | |
| 2008/0312979 A1 | 12/2008 | Lee et al. | |
| 2008/0313204 A1 | 12/2008 | Schultz et al. | |
| 2009/0036749 A1 | 2/2009 | Freiburger et al. | |
| 2009/0037488 A1 | 2/2009 | Abrams | |
| 2009/0063515 A1 | 3/2009 | Bar-Or et al. | |
| 2009/0083313 A1 | 3/2009 | Stanfill et al. | |
| 2009/0094291 A1 | 4/2009 | Yalamanchi | |
| 2009/0234623 A1 | 9/2009 | Germain et al. | |
| 2009/0319494 A1 | 12/2009 | Gooder | |
| 2009/0327196 A1 | 12/2009 | Studer et al. | |
| 2010/0100220 A1 | 4/2010 | Belanger et al. | |
| 2010/0114833 A1 | 5/2010 | Mu | |
| 2010/0121890 A1 | 5/2010 | Perkins et al. | |
| 2010/0138388 A1 | 6/2010 | Wakeling et al. | |
| 2010/0145914 A1 | 6/2010 | Kanno et al. | |
| 2010/0223218 A1 | 9/2010 | Prendergast | |
| 2010/0241828 A1 | 9/2010 | Yu et al. | |
| 2011/0055426 A1 | 3/2011 | Lakshmanan et al. | |
| 2011/0061057 A1 | 3/2011 | Harris et al. | |
| 2011/0066602 A1 | 3/2011 | Studer et al. | |
| 2011/0145297 A1 | 6/2011 | Singh | |
| 2011/0197122 A1 | 8/2011 | Chan et al. | |
| 2011/0276789 A1 | 11/2011 | Chambers et al. | |
| 2011/0295863 A1 | 12/2011 | Weir et al. | |
| 2012/0054164 A1 | 3/2012 | Falkebo et al. | |
| 2012/0089595 A1 | 4/2012 | Jaecksch | |
| 2012/0102029 A1 | 4/2012 | Larson et al. | |
| 2012/0158625 A1 | 6/2012 | Nelke et al. | |
| 2012/0167112 A1 | 6/2012 | Harris et al. | |
| 2012/0284255 A1 | 11/2012 | Schechter et al. | |
| 2012/0310905 A1 | 12/2012 | Hans et al. | |
| 2013/0166515 A1 | 6/2013 | Kung et al. | |
| 2013/0290298 A1 | 10/2013 | Weyerhaeuser et al. | |
| 2014/0033173 A1 | 1/2014 | Frenkiel | |
| 2014/0108357 A1 | 4/2014 | Procops et al. | |
| 2015/0088856 A1 | 3/2015 | Hunter et al. | |
| 2016/0019057 A1 | 1/2016 | Bach et al. | |
| 2016/0154896 A1 | 6/2016 | Simitsis et al. | |
| 2016/0203158 A1 | 7/2016 | Kling et al. | |
| 2016/0328406 A1 | 11/2016 | Convertino et al. | |
| 2017/0083573 A1 | 3/2017 | Rogers et al. | |
| 2017/0147644 A1 | 5/2017 | Lee et al. | |
| 2017/0177740 A1 | 6/2017 | Abaya et al. | |
| 2017/0308411 A1 | 10/2017 | Brill | |
| 2018/0113905 A1 | 4/2018 | Goerzig et al. | |

(56) References Cited

U.S. PATENT DOCUMENTS

| | | | |
|---|---|---|---|
| 2018/0285401 | A1 | 10/2018 | Dickie |
| 2019/0130048 | A1 | 5/2019 | Egenolf et al. |
| 2019/0179723 | A1 | 6/2019 | Allin et al. |
| 2019/0370407 | A1 | 12/2019 | Dickie |
| 2021/0182263 | A1 | 6/2021 | Dickie |
| 2021/0232579 | A1 | 7/2021 | Schechter et al. |
| 2021/0295244 | A1* | 9/2021 | Bennett ............... G06F 16/2428 |
| 2021/0406343 | A1* | 12/2021 | Sabra .................. G06F 16/1748 |
| 2022/0026895 | A1* | 1/2022 | Leitch ..................... G06N 20/00 |
| 2022/0245176 | A1* | 8/2022 | Weisman ............. G06F 16/215 |
| 2022/0327226 | A1* | 10/2022 | Rich ................... G06F 16/2465 |

FOREIGN PATENT DOCUMENTS

| | | |
|---|---|---|
| JP | H11-143755 A | 5/1999 |
| JP | 2003-529808 A | 10/2003 |
| JP | 2006-277624 A | 10/2006 |
| JP | 2014-519080 A | 8/2014 |
| WO | WO 2014/209260 A1 | 12/2014 |
| WO | WO 2016/177405 A1 | 11/2016 |
| WO | WO 2017/024164 A1 | 2/2017 |
| WO | WO 2017/048303 A1 | 3/2017 |

OTHER PUBLICATIONS

International Search Report and Written Opinion for International Application No. PCT/US2022/014541 dated Apr. 7, 2022.
International Search Report and Written Opinion for International Application No. PCT/US2018/025144 dated Jun. 21, 2018.
International Search Report and Written Opinion for International Application No. PCT/US2018/064217 dated Mar. 13, 2019.
International Search Report and Written Opinion for International Application No. PCT/US2019/033573 dated Jul. 26, 2019.
International Preliminary Report on Patentability for International Application No. PCT/US2018/025144 dated Oct. 10, 2019.
International Preliminary Report on Patentability for International Application No. PCT/US2019/033573 dated Dec. 10, 2020.
Communication pursuant to Article 94(3) EPC dated Jun. 22, 2021 in connection with European Application No. 18720443.3.
Communication pursuant to Article 94(3) EPC dated Dec. 8, 2021 in connection with European Application No. 18830094.1.
Communication pursuant to Article 94(3) EPC dated Jan. 25, 2022 in connection with European Application No. 19730617.8.
Notice of Reasons for Rejection for Japanese Application No. 2011-539631 dated Oct. 28, 2013.
International Search Report and Written Opinion for International Application No. PCT/US2015/049131 dated Nov. 26, 2015.
Canadian Examination Search Report for Application No. CA 2 744 881 dated Aug. 5, 2016.
Canadian Examination Search Report for Application No. CA 2 814 835 dated May 23, 2017.
Chinese Office Action for Chinese Application No. 201180051291.1 dated May 31, 2016.
European Search Report for European Application No. 10817836.9 dated Aug. 19, 2016.
Japanese Office Action (English Translation) for Japanese Application No. 2015-165472 dated Jul. 11, 2016.
Japanese Office Action (English Translation) for Japanese Application No. 2012-529903 dated Jul. 15, 2016.
Korean Office Action for Korean Application No. 10-2013-7010459 dated Sep. 20, 2017.
Japanese Office Action (English Translation) issued in Japanese Application No. 2012-529903 dated Aug. 11, 2014.
International Search Report and Written Opinion for International Application No. PCT/US2013/064979 dated Nov. 28, 2013.
International Search Report and Written Opinion for International Application No. PCT/US2012/021286 dated May 4, 2012.
International Search Report and Written Opinion for International Application No. PCT/US09/66210 dated Jan. 27, 2010.
International Search Report and Written Opinion for International Application No. PCT/US10/49142 dated Nov. 5, 2010.
International Search Report and Written Opinion for International Application No. PCT/US2011/057623 dated Jan. 25, 2012.
International Search Report and Written Opinion for International Application No. PCT/US2020/030612 dated Nov. 2, 2020.
[No. Author Listed], ApexSQL Plan 2017—Screen Shot Tour. Jun. 25, 2017; 18 pages. Retrieved from the Internet: https://web.archive.org/web/20170625041627/https://blog.apexsql.com/apexsql-plan-2017-screen-shot-tour/ [retrieved on Feb. 27, 2019].
[No. Author Listed], Collibra Data Intelligence Cloud Data Catalog. Collibra, The Data Intelligence Cloud. 2022. 13 pages. https://www.collibra.com/us/en/platform/data-catalog [Last accessed May 22, 2022].
[No. Author Listed], Data Catalog. IBM. 2022. 8 pages. https://www.ibm.com/topics/data-catalog#:~:text=A%20data%20catalog%20is%20a,any%20analytical%20or%20business%20purpose [Last accessed May 22, 2022].
[No. Author Listed], IBM Watson Knowledge Catalog. IBM. 2022. 12 pages. https://www.ibm.com/cloud/watson-knowledge-catalog [Last accessed May 22, 2022].
[No. Author Listed], Using Oracle Database Cloud Service Viewing Real Time SQL Monitor. Oracle Database Cloud Service. Help Center. 2016;3 pages.
[No. Author Listed], What Is a Data Catalog and Why Do You Need One? OCI. 2022. 7 pages. https://www.oracle.com/big-data/data-catalog/what-is-a-data-catalog/ [Last accessed May 22, 2022].
Chaiken et al., Scope: easy and efficient parallel processing of massive data sets. Proceedings of the VLDB Endowment. Aug. 1, 2008;1(2):1265-76.
Farina, SQL Server 2014 Real Time Query Monitoring. Zero to Hero: 12 Tips for the Accidental DBA. Last update: Sep. 9, 2014; 7 pages.
Gawade et al., Stethoscope: a platform for interactive visual analysis of query execution plans. Proceedings of the VLDB Endowment. Aug. 1, 2012;5(12):1926-9.
Giraud-Carrier, A reconfigurable dataflow machine for implementing functional programming languages. ACM Sigplan Notices. Sep. 1, 1994;29(9):22-8.
Haeberli et al., Autonomous grids. Implementing national virtual organisations. Feb. 2006. 12 pages.
Harkins, Use Excel's conditional formatting to find errors. TechRepublic. Feb. 16, 2008. [http://www.techrepublic.com/blog/microsoft-office/use-excels-conditionalformatting-to- find-errors/].
Koltakov, Real-Time SQL Monitoring. Oracle. Dec. 2009; 30 pages.
Liskin, Windows Sources: Microsoft Access 97 for Windows Superguide. Ziff-Davis Press; 1997:117-57,687-39.
Melia et al., Constraint-based validation of adaptive e-learning courseware. IEEE Transactions on Learning Technologies. Jan. 23, 2009;2(1):37-49.
Mishra et al., ConEx: a system for monitoring queries. Proceedings of the 2007 ACM SIGMOD international conference on Management of data. Jun. 11, 2007:1076-78.
Murray et al., Incremental, iterative data processing with timely dataflow. Communications of the ACM. Oct. 2016;59(10):75-83.
Pinheiro et al., Mobile Agents for Aggregation of Network Management Data. Proceedings of the First International Symposium on Agent Systems and Applications Third International Symposium on Mobile Agents Oct. 3, 1999. 11 pages.
Rull et al., MVT: a schema mapping validation tool. Proceedings of the 12th International Conference on Extending Database Technology: Advances in Database Technology Mar. 24, 2009:1120-23.
Smits et al., FlowSpec: declarative dataflow analysis specification. InProceedings of the 10th ACM SIGPLAN International Conference on Software Language Engineering Oct. 23, 2017:221-31.
Stockinger et al., Matchmaking, Datasets and Physics Analysis. 2005 International Conference on Parallel Processing Workshops (ICPPW'05) Jun. 14, 2005;21-8.
Van Megen et al., Costs and benefits of early defect detection: experiences from developing client server and host applications. Software Quality Journal. Dec. 1995;4(4):247-56.

\* cited by examiner

FIG. 3

Input Dataset

Choose Dataset
Input Items:

🔍 loy  ⊙  🔍 Search

| Name | Cart | Kind | Schema | Data Space | Descript |
|---|---|---|---|---|---|
| transactions_list | Loyalty Data | file | retail | retail_files | |
| transactions_list | Loyalty Data | file | retail | retail_files | |
| transactions_list | Loyalty Data | file | retail | retail_files | |

← Back

Select →
← Clear

Selected Item:

OK  Cancel

Choose Catalog Dataset

Input items:

[🔍 email] [⊙] [🔍 Advanced] ▫

| Name | Cart | Kind | Schema | Data Space | Fields |
|---|---|---|---|---|---|
| transactions_list | Admin Data | file | retail | retail_pub_files | ~~~<br>Email<br>~~~ |
| transactions_list | Admin Data | file | eme | retail_pub_files | Email<br>~~~ |
| loyalty | Admin Data | file | retail | retail_pub_files | email_address<br>~~~<br>~~~ |
| loyalty_present | Loyalty Program | file | eme | retail_pub_files | email_address |
| ∙ ∙ | | | | | |

Selected item:

📄 loyalty

[Replace →]
[← Clear]

[OK] [Cancel]

HOME

- Business Glossary
- Technical Assets
- Business Assets
- Data Quality
- Logical Assets
- Performance Data

Q SEARCH

Dataset in Technical Assets   ○ Back to list view

○ 82 rows  Filters: Contains text loyalty ×  Clear All

Show ▼  Sort by: Relevance ▼

REFINE  [Show Factor]

loyalty  [Q]

▷ Type
▷ Repository Type
▷ Repositories
▷ Technical Hierarchy
▷ IT Application
▽ Data Quality
  □ Has Data Profile
  □ Has Operational History
  □ Has Data Quality
  □ Data Catalog
  □ Catalog data available
▽ Lineage
  □ Has Lineage
  □ Is Read
  □ Is Written
  □ Is Both Read and Written
▷ Active Retention Period
▷ Archive Retention Period
▷ Dataset Content Type
▷ Frequency
▷ Refresh Type
□ Technical Data Steward
▷ Data Domain

| General Information | Schema or Directory | Repository | IT Application | IT System |
|---|---|---|---|---|
| □ loyalty<br>Type:File | ⊗ retail | □ Technical Repository | ⊗ Retail | □ Analytics |
| □ loyalty<br>Type:File | ⊗ eme | □ Technical Repository | ⊗ Retail | □ Analytics |
| □ loyalty<br>This file contains customers in our loyalty programs<br>Type: QueryIt DataSource | ⊗ retail | □ queryIt Instance | | |
| □ loyalty<br>Type:QueryIt DataSource | ⊗ eme | □ queryIt Instance | | |
| □ loyalty_data.dat<br>Type:File | ⊗ temp | □ Technical Repository | ⊗ Retail | □ Analytics |
| □ new_loyalty_signups.dat<br>Type:File | ⊗ main | □ Technical Repository | | |
| □ Vmat_loyalty_married_customers<br>This is a materialized view of Loyalty_present<br>Type: View | ⊗ retail | □ queryIt-instance | | |

FIG. 10A

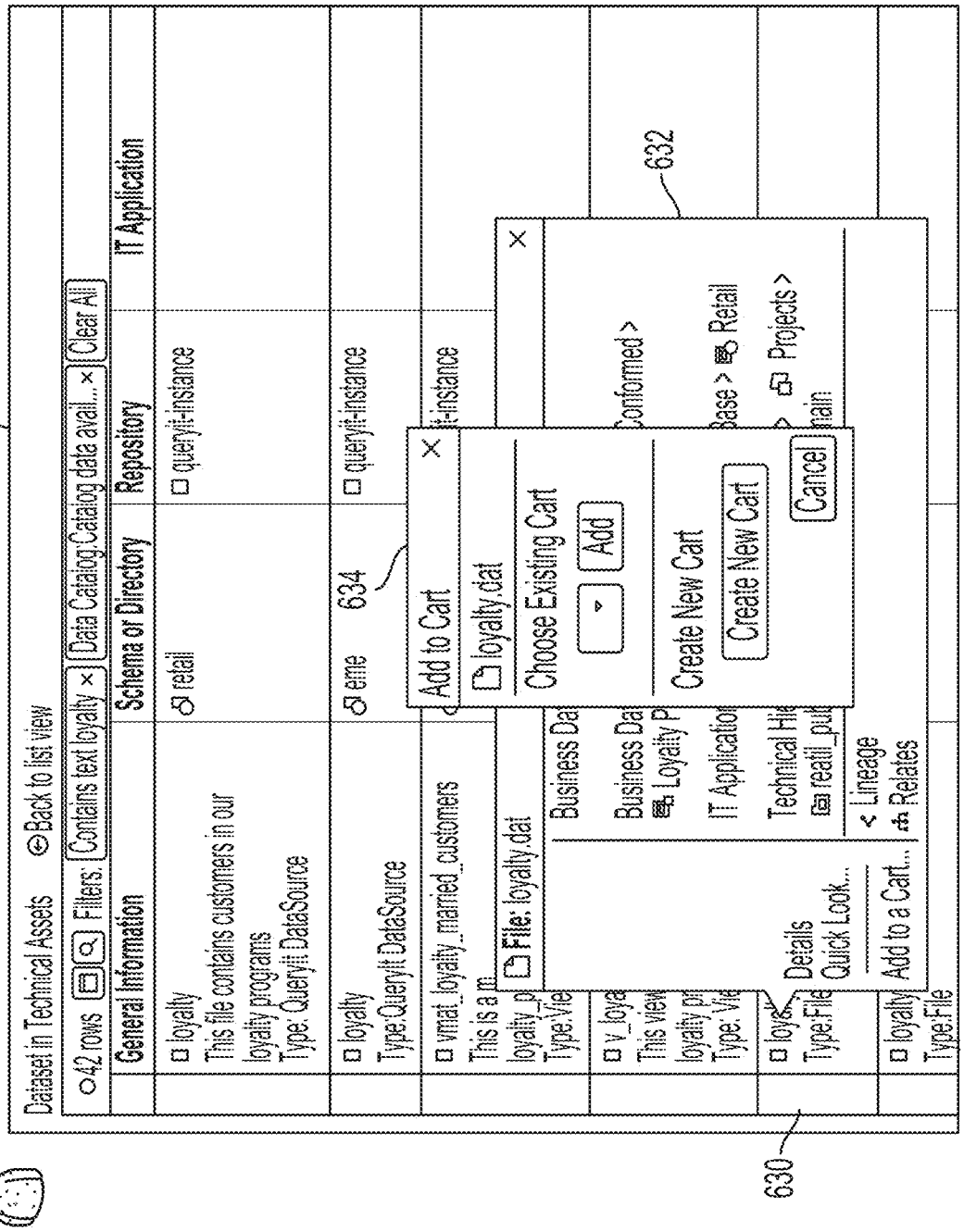
FIG. 10C

DATA PROCESSING SYSTEM WITH MANIPULATION OF LOGICAL DATASET GROUPS

CROSS-REFERENCE TO RELATED APPLICATIONS

This application claims the benefit of priority under 35 U.S.C. 119(e) to U.S. Provisional Patent Application Ser. No.: 63/163,699, filed on Mar. 19, 2021, titled "DATA PROCESSING SYSTEM WITH MANIPULATION OF LOGICAL DATASET GROUPS", and U.S. Provisional Patent Application Ser. No.: 63/143,924, filed on Jan. 31, 2021, titled "DATA PROCESSING SYSTEM WITH MANIPULATION OF LOGICAL DATASET GROUPS," which are hereby incorporated by reference herein in their entirety.

FIELD

Aspects of the present disclosure relate to techniques for efficiently operating a data processing system with a large number of datasets that may be stored in any of a large number of data stores.

BACKGROUND

Modern data processing systems manage vast amounts of data within an enterprise. A large institution, for example, may have millions of datasets. This data can support multiple aspects of the operation of the enterprise such that having such a large number of datasets may be invaluable to the enterprise. Some datasets, for example, may support routine processes, such as tracking customer account balances or sending account statements to customers. In other instances, processing the data from one or more datasets may generate business insights, such as a conclusion that a requested transaction is fraudulent or that the enterprise is exposed to a particular level of financial risk as a result of transactions in the aggregate in a particular geographic region. In yet other instances, processing the data from one or more datasets may generate technical insights, such as a conclusion that the enterprise is exposed to a risk of technical failure as a result of an incorrect technical process.

Datasets may be accessed by applications executed by the data processing system or via tools invoked by users of the data processing system. Applications may be developed by programmers to perform repeated processes, such as tracking customer account balances or sending account statements to customers. The programmer may designate datasets to be the source of data input to that process or to be the destination for results generated by executing the process. Tools may also perform operations using datasets. For example, a data processing system may include a tool that enables a user to process a dataset to remove invalid records or to generate metrics on the dataset, such as the number of records or fields that contain invalid values.

To aid users, dataset search capabilities may be provided to assist the user in finding an appropriate dataset among the datasets within the enterprise. An application development environment, for example, may include a dataset search interface through which an application programmer may specify characteristics of a desired dataset. The programmer may then select an input or output dataset from among the search results. Similar searching may enable a user to identify a dataset as the input or output of a tool.

Searching may be based on metadata stored for datasets. For example, a data processing system may store metadata for datasets that indicates values of one or more parameters that characterize the datasets. That metadata may include, for example, names or descriptions of fields in the dataset or the dataset itself. As another example, the metadata may indicate an organization within an enterprise that created the dataset, a program that generated the dataset, the date of creation of the dataset. These or other types of metadata might be used in searching for a dataset.

SUMMARY

According to some aspects, a method for enabling efficient operation of a data processing system in an environment with multiple datasets by forming dataset groups and presenting dataset groups for selection in connection with configuring an operation that accesses one or more datasets is provided. The method comprises receiving input, from the first user, through one or more first user interfaces selecting one more datasets of a plurality of datasets for association with a group of a plurality of groups of datasets; storing representations of the plurality of groups of datasets; presenting a second user interface configured for selection, by the second user, of one or more datasets for use in conjunction with the operation that accesses one or more datasets, wherein the second user has a persona and datasets have scopes based at least in part on persona of users, wherein presenting the second user interface comprises: automatically identifying one or more groups of datasets based at least in part on a correspondence between the persona associated with the second user of the data processing system and scopes associated with the one or more automatically identified groups of datasets; and rendering an indication of the one or more automatically identified groups of datasets in the second user interface.

According to one aspect, storing representations of the plurality of groups comprises for each group of the plurality of groups of datasets, storing information regarding one or more users authorized to access the group.

According to one aspect, the one or more first user interfaces comprise a dataset search interface comprising a faceted search interface; and facets in the faceted search interface are based on values of metadata associated with the plurality of datasets.

According to one aspect, the one or more first user interfaces comprise a user interface displaying lineage of a dataset.

According to one aspect, the one or more first user interfaces comprise a user interface displaying metadata related to a dataset of the plurality of datasets.

According to one aspect, the method further comprises receiving through the second user interface input from the second user specifying a group of the one or more automatically identified groups; and based on the received input from the second user, performing the operation for each of a plurality of datasets within the selected group.

According to one aspect, the operation comprises configuring an application for execution by the data processing system.

According to one aspect, automatically identifying one or more groups of datasets based at least in part on a correspondence between the persona associated with the second user of the data processing system and scopes associated with the one or more automatically identified groups of datasets comprises selecting one or more groups of datasets that the second user has permission to access.

According to one aspect, rendering the indication of the one or more automatically identified groups comprises rendering a graphical user interface element indicative of a group of datasets for each of the one or more automatically identified groups; and the method further comprising receiving, via the second user interface, a selection of a rendered graphical user interface element indicative of a group of datasets and, based on the selection, rendering on the second user interface a plurality of datasets in the group.

According to some aspects, a method for enabling efficient operation of a data processing system in an environment with multiple datasets by presenting dataset groups for selection by a user of the data processing system in connection with configuring an operation that accesses one or more datasets is provided. The method comprises presenting a user interface configured for selection by the user of one or more datasets for use in conjunction with the operation that accesses one or more datasets, wherein the user has a persona and datasets have scopes based at least in part on persona of users, wherein presenting the user interface comprises: automatically identifying one or more groups of datasets based at least in part on a correspondence between the persona associated with the user of the data processing system and scopes associated with the one or more automatically identified groups of datasets; and rendering an indication of the one or more automatically identified one or more groups of datasets in the user interface.

According to one aspect, the method further comprises receiving user input through the user interface specifying a group of the one or more groups; and based on the received input, rendering an indication of datasets within the selected group.

According to one aspect, the method further comprises receiving user input through the user interface specifying a group of the one or more groups; and based on the received input, performing the operation for each of a plurality of datasets within the selected group.

According to one aspect, automatically identifying one or more groups of datasets further comprises: receiving, via the user interface, a search query for datasets; and executing a search based on the search query to generate search results.

According to one aspect, the operation comprises configuring an application for execution by the data processing system.

According to one aspect, automatically identifying one or more groups of datasets based at least in part on a correspondence between the persona associated with a user of the data processing system and scopes associated with the one or more automatically identified groups of datasets comprises selecting one or more groups of datasets that the user has permission to access.

According to one aspect, rendering the indication of the one or more automatically identified groups comprises rendering a graphical user interface element indicative of a group of datasets for each of the one or more automatically identified groups; and the method further comprising receiving a selection of a rendered graphical user interface element indicative of a group of datasets and, based on the selection, rendering on the user interface a plurality of datasets in the group.

According to some aspects, a method for enabling efficient operation of a data processing system in an environment with multiple datasets by enabling selection of a group of datasets for performing an operation on each of multiple datasets in the group is provided. The method comprises receiving, via a user interface, a search query to search for datasets for use in conjunction with an operation relating to data access with the data processing system; presenting results of the search based on the search query in the user interface, wherein presenting the results comprises presenting one or more groups of datasets, at least some of the groups of datasets each comprising one or more of the searched datasets; receiving, via the user interface, a manipulation of a first group of datasets of the one or more groups of datasets presented in the user interface, wherein the user interface is configured to provide an option for selecting, via the user interface, the first group of datasets as a target of the operation relating to data access; and upon selection of the first group of datasets of the one or more groups of datasets presented in the user interface, performing the operation on each of one or more datasets included in the first group of datasets.

According to one aspect, performing the operation on each of one or more datasets comprises executing data quality rules on each of the one or more datasets.

According to one aspect, the user interface provides an option for expanding the first group of datasets to enable selection, via the user interface, of one or multiple datasets of the first group of datasets as a target of the operation relating to data access, and upon selection of the one or multiple datasets of the first group of datasets, performing the operation on each of the one or multiple datasets of the first group of datasets.

According to one aspect, each of the one or more groups of datasets presented in the user interface has correspondence between a persona associated with a user, who entered the search query via the user interface, and a scope associated with the one or more groups of datasets.

According to one aspect, the search results exclude datasets that do not have metadata associated with the persona of the user.

According to some aspects, a method for enabling efficient operation of a data processing system in an environment with multiple datasets by forming groups of datasets is provided. The method comprises rendering one or more first user interfaces in which a plurality of datasets are identified; receiving user input through the one or more first user interfaces selecting one more identified datasets for association with a group of a plurality of groups of datasets; and storing representations of the plurality of groups of datasets.

According to one aspect, storing representations of the plurality of groups comprises: for each group of the plurality of groups of datasets, storing information regarding one or more users authorized to access the group.

According to one aspect, the method further comprises rendering a second user interface associated with user configuration of the data processing system to perform an operation related to data access, wherein the second user interface comprises a dataset selection portion; and rendering the second user interface comprises presenting a representation of one or more groups of the plurality of groups of datasets in the dataset selection portion.

According to one aspect, the method further comprises selecting based on a persona of a user the one or more groups of the plurality of groups of datasets for presentation in the second user interface.

According to one aspect, the second user interface comprises a user interface in a program development environment; and the operation related to data access comprises configuring a component in a program under development to access a dataset or a group of datasets.

According to one aspect, the one or more first user interfaces comprise a dataset search interface.

According to one aspect, the dataset search interface comprises a faceted search interface; and facets in the faceted search interface are based on values of metadata associated with the plurality of datasets.

According to one aspect, the one or more first user interfaces comprise a user interface displaying lineage of a dataset.

According to one aspect, the one or more first user interfaces comprise a user interface displaying metadata related to a dataset of the plurality of datasets.

According to some aspects, a method for enabling efficient operation of a data processing system in an environment with multiple datasets is provided. The method comprises means for rendering one or more first user interfaces in which datasets are identified; means for receiving user input through the one or more first user interfaces selecting one or more identified datasets for association with a group of a plurality of groups of datasets; and means for storing representations of the plurality of groups of datasets.

According to one aspect, the method further comprises means for rendering a second user interface associated with user configuration of the data processing system to perform an operation related to data access, wherein the second user interface comprises a dataset selection portion; and means for rendering the second user interface comprises presenting a representation of one or more groups of the plurality of groups of datasets in the dataset selection portion.

According to one aspect, the method further comprises means for selecting based on a persona of a user the one or more groups of the plurality of groups of datasets for presentation in the second user interface.

According to some aspects, a method for creating dataset groups in a data processing system operable with a plurality of datasets is provided. The method comprises identifying a set of datasets that are available for use in performing an operation by the data processing system, the operation relating to data access with the data processing system; presenting the identified set of datasets in a first user interface; receiving, via the first user interface, a user selection of one or more datasets from the presented identified set of datasets; and storing a representation of a group comprising the selected one or more datasets.

According to one aspect, identifying the set of datasets that are available for use in performing an operation relating to data access with the data processing system comprises: receiving, via a user interface, a search query specifying one or more values of facets that describe the plurality of datasets defined in the data processing system; and executing a search based on the search query to generate search results, the search results including the set of datasets that are available for use in performing the operation.

According to one aspect, the search query comprises a faceted search query, the faceted search query including one or more facets for filtering the search results.

According to one aspect, the one or more facets comprises a facet indicating whether a dataset is registered in a catalog associating information for accessing a physical dataset to a logical dataset.

According to one aspect, the user interface for receiving the search query comprises a plurality of fields for receiving user input identifying values for the one or more facets; and the plurality of fields comprise fields for receiving values of logical, physical and/or operational metadata associated with the plurality of datasets.

According to one aspect, the operation relating to data access comprises configuring components of an application executed by the data processing system.

According to one aspect, receiving, via a second user interface, a command to update the group, the command including a request to add one or more datasets to the group or a request to delete one or more datasets from the group.

According to one aspect, presenting, via the first user interface, metadata regarding a dataset of the identified set of datasets in response to user input requesting metadata relating to the dataset.

According to one aspect, the group is a second group; and receiving the user selection of one or more datasets comprises receiving a selection of a previously defined first group of datasets such that the second group comprises a hierarchical grouping of datasets.

According to one aspect, storing the representation of the group comprises storing scope information for the group.

According to one aspect, the scope information comprises identification of one or more users authorized to access the group.

According to one aspect, the scope information comprises identification of one or more roles authorized to access the group.

According to one aspect, the method further comprises rendering a second user interface associated with user configuration of the data processing system to perform the operation relating to data access, wherein the second user interface includes a dataset selection portion and rendering the second user interface comprises presenting a representation of the group comprising the selected one or more datasets in the dataset selection portion.

Various aspects described above may be used alternatively or additionally with aspects in any of the systems, methods, and/or processes described herein. Further, a data processing system may be configured to operate according to a method with one or more of the foregoing aspects. Such a data processing system may comprise at least one computer hardware processor, and at least one non-transitory computer-readable medium storing processor executable instructions that, when executed by the at least one computer hardware processor, cause the at least one computer hardware processor to perform such a method. Further, a non-transitory computer-readable medium may comprise processor executable instructions, that when executed by at least one computer hardware processor of a data processing system, cause the at least one computer hardware processor to perform a method with one or more of the foregoing aspects. As such, the foregoing is a non-limiting summary of the invention, which is defined by the attached claims.

BRIEF DESCRIPTION OF DRAWINGS

Various aspects will be described with reference to the following figures. It should be appreciated that the figures are not necessarily drawn to scale. Items appearing in multiple figures are indicated by the same or a similar reference number in all the figures in which they appear.

FIG. 3 is an illustration of an exemplary graphical user interface, rendered by a data processing system, through which a user may select a logical dataset, in which the user has entered input requesting a view of data in a physical dataset corresponding to a logical dataset available for selection;

FIG. 4B is an illustration of the exemplary graphical user interface of FIG. 4A, rendered by a data processing system, through which a user may select a dataset, in an operating state after the search query has been executed and a list of datasets is presented matching the search query for the user to select one or more datasets as a target of an operation;

FIG. 5 is an illustration of an exemplary graphical user interface rendered by a data processing system, through which a user may select a dataset, in an operating state after executing a search query limiting a list of datasets to those including a field storing an email;

FIG. 7 is an illustration of an exemplary graphical user interface, rendered by a data processing system, through which a user may view or change information related to a dataset cart;

FIG. 10A is an illustration of an exemplary graphical user interface, rendered by a data processing system, through which a user may search for datasets;

FIG. 10C is an illustration of the exemplary graphical user interface of FIG. 10A, in an operating state in which a user has indicated a dataset for inclusion in a group of datasets, here indicated as a dataset cart;

DETAILED DESCRIPTION

Figure 1A:
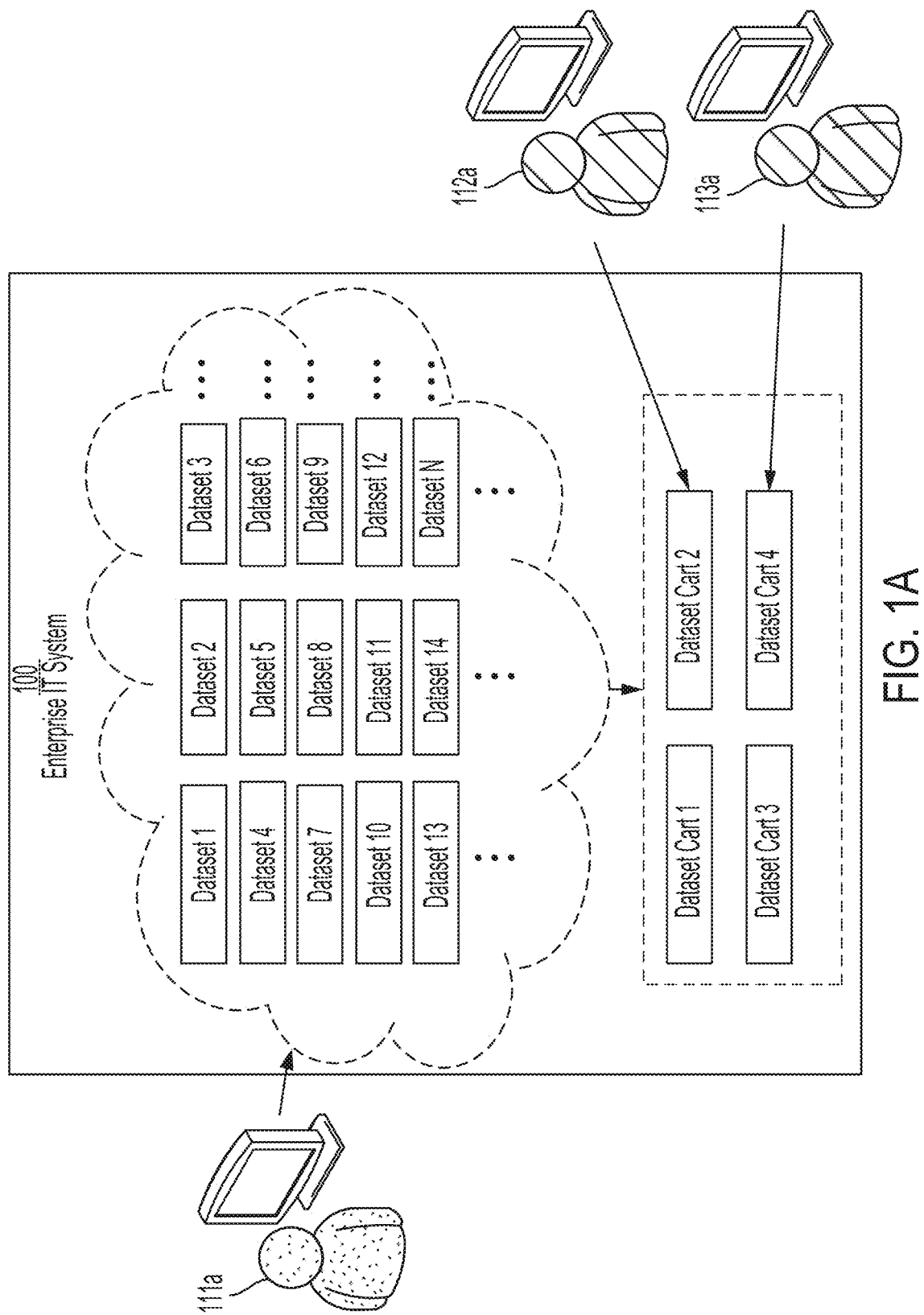
FIG. 1A is a diagram showing different users of an exemplary enterprise IT system creating and using groups of datasets, such as, dataset carts according to an aspect of the technology described herein.

The inventors have recognized and appreciated that a data processing system may run more efficiently and may be a more effective tool for data analysis when it supports manipulation of groups of datasets that may serve as a target of an operation performed by the data processing system. The groups, instead of or in addition to individual datasets, may be presented in user interfaces through which a user is to select one or multiple dataset(s) as the target of the operation. The user may then manipulate the group, such as by expanding the group to enable selection of any of its constituent elements as a target of the operation or, in some scenarios, selecting the group as the target of the operation such that the operation is performed on all of the datasets in the group. As the datasets to be processed via the operation can be selected by the user directly through the manipulation of the group presented in the user interface, it is no longer necessary to locate and make settings for manipulation of individual datasets. In other words, the technique described herein provides a graphical shortcut for initiating processing of one or even multiple datasets via a user-initiated action without having to cycle through the datasets and setting menus for each individual dataset that needs to be processed.

Groups of datasets may be scoped such that a specific group will only appear as a result of a search within the scope for that group. By scoping dataset groups, the data processing system can automatically present groups of datasets that are relevant at the time a search for a dataset is conducted. In an enterprise in which there may be literally millions of datasets, the search results may exclude datasets that are not relevant to the user and/or task being performed by that user. Searching for an appropriate dataset, therefore, may be faster and consume less processing resources, in addition to delivering more relevant search results. That is, the groups of datasets described herein assist to perform the technical tasks of storing and retrieving data for efficient management of data, such as in a database management system. In other words, the groups of datasets facilitate access to data in an efficient manner.

Manipulation of groups of datasets may be advantageous in a data processing system in which a rich set of metadata is maintained about datasets. The metadata may be used to search for or otherwise specify datasets for use as the target of an operation relating to data access in a data processing system. While a rich set of metadata provides great flexibility in specifying search queries to identify datasets for a particular data access operation, that flexibility can lead to complex user interfaces, long search times or extensive use of computer resources, any or all of which may degrade the effectiveness of the data processing system. Searching for groups of datasets that are scoped for the user may enable a simpler search interface to return equally relevant or more relevant search results in less time and/or with less computer resources. The metadata may relate to multiple aspects of the dataset, such as logical, physical and/or operational aspects of the datasets.

Logical aspects may refer to the significance of the data in a dataset or a field within a dataset to the enterprise or to people within the enterprise. The logical aspects may be applicable to the dataset regardless of the physical storage of that dataset. For example, a dataset may be defined for holding customer data. That dataset may have a schema specifying fields holding certain types of data that is meaningful within an enterprise, such as customer name, customer identifier, e-mail, physical address, and phone number. Fields may be specified as relating to such logical entities independently of the underlying physical storage of the data representing these entities.

Physical aspects, in contrast, may relate to the manner in which data in a dataset is stored. The dataset, for example, may be stored in a particular data store, implemented with specific storage hardware and software. That software, for example, may organize stored datasets in tables with rows of cells. The data corresponding to a logical entity may be stored in a particular cell or cells in each row. For example, data constituting an e-mail address may be stored in three fields, one identified as a username, another as a domain name and another as a TLD. Metadata about physical aspects of the dataset may relate to aspects of the physical data store, such as the storage schema in physical storage, the software used to organize data in the dataset, and/or the hardware holding the data of the dataset. Alternatively or additionally, the physical metadata may indicate characteristics of the data, including for example the amount or quality of the data. Metadata related to amount of data may indicate, for example, the total amount of data in the dataset, such as a number of records in a dataset. Other metadata related to amount may indicate number of records with a certain value in a particular field. Metadata related to quality of the data may indicate, for example, number of records for which certain fields are absent or for which certain fields contain an invalid value.

Operational aspects may relate to operations performed with the dataset. For example, operational metadata may be recorded for each job executed by the data processing system. That metadata may indicate datasets accessed during the job, as well as other information about the job, such as values of parameters input to the job, date or time of execution of the job, or a user requesting execution of the job.

A repository of metadata in a data processing system may store other items of metadata about datasets. Such metadata may include items that define the province of the dataset, such as which user defined the schema for the dataset or the system from which data in a physical dataset was imported. As another example, a textual description of a dataset or a field may be recorded.

Regardless of the specific items of metadata that may be maintained in a data processing system, the metadata may be used in grouping and/or searching for a dataset or datasets from among a large universe of datasets within an enterprise for use as a target of an operation with the data processing system. The metadata about the various aspects may be stored by the data processing system in such a way that they may be related to one another. As a result, a search may seek a dataset meeting combinations of aspects of the metadata. A data processing system may provide a dataset selection tool with a user interface through which a user may search for datasets meeting multiple criteria on the dataset metadata. The user may then select a dataset as a target from among the datasets identified by the search. In embodiments in which groups of datasets is scoped, the dataset selection tool may limit the search to return only dataset groups containing datasets within the scope and/or only dataset groups that are within the scope.

For example, a user developing an application in a development environment may select a dataset as an input of an application. The dataset selection tool may present a user interface that enables the user to select a dataset that is then identified to the development environment as the target of an operation within the development environment that connects the application to an identified dataset. To make a selection, the user may input a search query specifying a combination of values for some of the logical, physical and/or operational metadata aspects. As a specific example, the search query may specify datasets including an e-mail, that has a data quality for the e-mail field above a specified threshold amount and that was used in a job within the last week. A faceted search interface, with the different aspects of dataset metadata supplying facets for the search, may be used for this purpose. The user may then select from the result set returned by the data processing system as a result of executing this query against the dataset metadata repository in the system. If the result set includes one or more dataset groups, the user may provide input, serving as a command to expand the dataset group and show the datasets it contains. A dataset may then be selected from the expanded dataset group. The user selected dataset may be returned to the development environment to use as the input dataset for the application under development.

As another example, the dataset selection tool may be used to select datasets on which maintenance might be performed. A user, for example, might wish to select datasets on which to run data quality rules. In this example, the dataset selection tool may be used to identify a dataset that is supplied as a target for a tool that executes a set of data quality rules on a dataset. A user might search via the selection tool for datasets that are frequently used in jobs, meeting other logical, physical and/or operation requirements, and then select from this result set for data quality analysis one or more of those datasets. If the result set includes one or more dataset groups, the user may provide input, serving as a command to expand the dataset group and show the datasets it contains. A dataset may then be selected from the expanded dataset group. In some embodiments, rather than select a single dataset, the user may select a dataset group. In this context, rather than present the contents of the dataset group for the user to make a selection of a single dataset, the dataset group may be selected and provided as the target. When a group is provided as a target to a tool that performs an operation on a dataset, that operation may be performed on each dataset within the group.

To aid in selection, the dataset selection tool may enable a user to access additional information about datasets returned in response to a search query. The additional information may include, for example, some or all the metadata that is stored for a dataset included in the search set. Alternatively or additionally, the additional information may include information about the data in a selected dataset. For example, the additional information may include a view of a few rows or data in a selected dataset. This additional information may be presented in response to user interaction with user interface elements, for example.

In an enterprise with a large number of datasets, enabling datasets to be manipulated in groups enhances dataset search functionality. Groups, which are represented in exemplary embodiments herein as dataset carts, may be predefined and, like datasets, may have associated metadata that may define which datasets are members of the group. The associated dataset cart metadata may include logical, physical and/or operational metadata. Dataset search capability may, instead of or in addition to returning individual datasets, may return groups of datasets, such as dataset carts. Dataset carts may be represented by an icon that is visually distinctive so as to appear different than the representation of an individual dataset. The icon, for example, may appear as a shopping cart. In this specification, the description of features in context of dataset carts are not limited to dataset carts and apply to any representation of groups of datasets.

A search for a dataset may be limited to return dataset carts in which some or all of the datasets in the dataset cart meet specified search criteria. Alternatively, the search interface may include, for example as a facet of the search, an option for a user to specify that only dataset carts, rather than individual datasets, are returned in response to the search query.

Dataset carts may enable a user to limit the quantity of datasets considered in making a selection of a dataset as the target of an operation in the data processing system. In an enterprise with millions of datasets, even tightly specified search criteria may return so many datasets that it is difficult for a user, without significant additional effort, to identify the most appropriate dataset or even an appropriate dataset, such as for further processing. For example, dataset carts may be pre-defined to hold datasets that are appropriate for certain tasks such that limiting selection of a dataset from a cart reduces the time needed in selecting an appropriate dataset. Also, a larger number of actually relevant search results for that user can be produced.

Dataset carts may be pre-defined by the same user who is performing a search for datasets. The user might then only consider selection of a dataset from one of their own dataset carts. Alternatively or additionally, dataset carts may be curated by other users of the data processing system. A user responsible, for example, for maintaining data about customers enrolled in a customer loyalty program may curate a dataset cart so as to include datasets representing the most authoritative sources of information about the loyalty program. Other users may then limit selection of datasets for data analytics involving the customer loyalty program to datasets in the cart. A data processing system may limit results of a search for a dataset to just dataset carts or datasets that are in a dataset cart accessible to the user requesting the search.

A data processing system supporting dataset carts may provide any of multiple benefits within an enterprise. For example, the data processing system may automatically enforce a process flow that leads to greater efficiencies. FIG. 1A illustrates how different users of an IT system 100 may create and use dataset carts within an enterprise. As shown in FIG. 1A, first users of a data processing system of the IT system 100, such as user 111a and those knowledgeable about the datasets, their lineage, and their individual advantages and weaknesses, for example, may define or create dataset carts (such as, dataset carts 1, 2, 3, 4) suitable for certain types of data analysis from a number of datasets, such as datasets 1-N. Second users of the data processing system, such as users 112a, 113a and those knowledgeable about data analysis, may quickly select one or more of those dataset carts or datasets relevant to specific analysis tasks from those dataset carts. As another benefit, the human and computer work of searching for datasets across a large universe of datasets in an enterprise may be done when datasets are assigned to dataset carts. Thereafter, searching for a dataset for use in an operation relating to data access may be simplified, both in human and computer work. As a specific example, the search interface for selecting a dataset for use in an operation relating to data access may contain only a subset of the search facets or other options of a search interface for selecting datasets for inclusion in a dataset cart, as fewer search facets may be needed to find relevant datasets if search results are limited to dataset carts with a relevant scope.

Figure 1B:
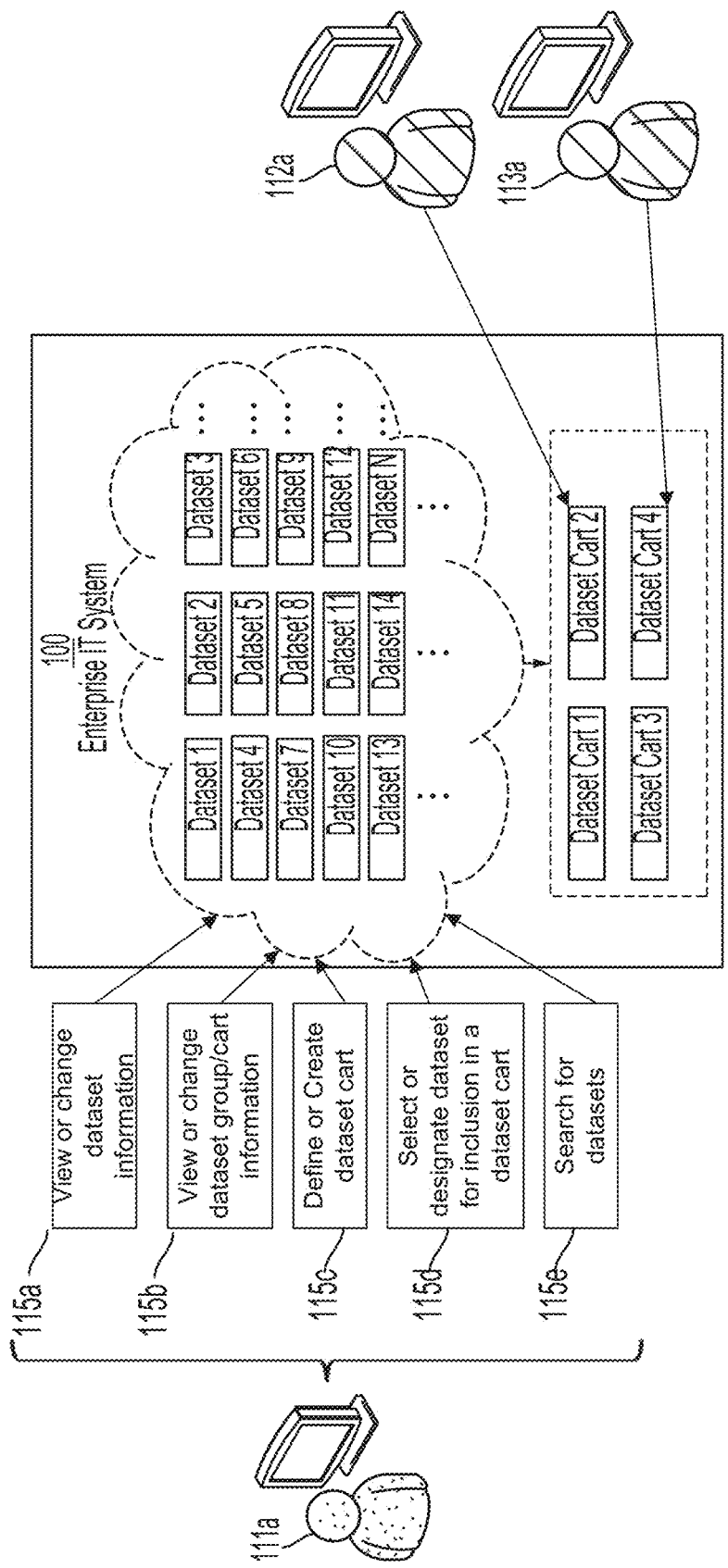
FIG. 1B is a diagram showing a user of an exemplary enterprise IT system performing various actions relating to datasets for purposes of creating and/or managing groups of datasets, according to an aspect of the technology described herein.

FIG. 1B illustrates various actions (e.g., actions 115a, 115b, 115c, 115d, 115e) that a first user, such as user 111a, may perform for purposes of defining, creating and/or managing dataset carts. For example, user 111a may view or change information about a dataset and/or a dataset group/cart via interfaces described in relation to FIGS. 6, 7, and 11. As another example, user 111a may define or create dataset carts via interfaces described in relation to FIGS. 8A and 8B. As yet another example, user 111a may select or designate a dataset for inclusion in one or more dataset carts via interfaces described in relation to FIGS. 9 and 10C. As another example, user 111a may search for datasets via interfaces described in relation to FIGS. 10A and 10B.

Performing these or other operations may require user 111a to have specialized knowledge about some or all of datasets Dataset 1 . . . Dataset N or may require user 111a to undertake time consuming searching through a large number of such datasets. However, as illustrated in FIG. 1B, creating a smaller number of dataset carts may avoid the burdens of these operations on users 112a and 113a and on the enterprise IT system. Processing power and network bandwidth required for a user to 112a or 113a to make such a selection, for example, may be reduced. Moreover, this reduction is computational resources may be compounded, as users such as 112a and 113a may search for relevant datasets frequently.

The grouping of datasets may be hierarchical. A group of datasets may include, in addition to datasets, a sub-group of datasets. The hierarchy may continue to any number of levels, with sub-groups in turn containing further sub-groups. In the example in which a group is represented as a dataset cart, the dataset cart may include, instead of or in additional to datasets, a sub-group of datasets. That sub-group may be identified as a dataset cart within a cart or the dataset cart may identify a top level grouping with the sub-group represented in a different way.

The dataset selection tool may conditionally perform operations on groups of datasets returned in a search, depending at least in part on the operation for which the dataset selection tool has been invoked. For example, if the operation requires a single dataset as its target, user selection of a group following execution of a search query, whether that group is a dataset cart or sub-group, may result in the dataset selection tool expanding the group to enable the user to select a single dataset. Conversely, if the operation can be applied to multiple datasets, the user may be prompted or otherwise provided with a mechanism to select all the datasets in the group as the target or have the system present the multiple datasets in the group from which the user may then make a selection. Such a selection tool may be implemented, for example, by providing separate navigation and selection controls. Via the navigation controls, the user may traverse the hierarchy of dataset groupings. Via the selection controls the user may select, as desired a single dataset or a dataset group. In some instances, the selection controls may be context dependent. For example, the selection control may be configured so as to preclude selection of a dataset group in a scenario in which only a single dataset is an appropriate target.

The groups may be scoped such that the groups returned in response to a search query are limited based on scope. For example, dataset carts may be scoped based on persona of a user. A persona, for example, may indicate a specific individual or multiple individuals. Individuals may be specified based on their identities, which may be established by credentials for example, or may be specified based on membership in one or more groups, such as membership in a department or on a particular project team within an enterprise. Alternatively or additionally, a persona may be established based on role within the enterprise, such as data analyst, application developer, test engineer or database programmer. Other criteria may alternatively or additionally be used to identify users authorized for use of a dataset cart and may be used in specifying persona.

Scoping dataset carts may limit the quantity of data returned to any particular user in response to a search for a dataset through the dataset selection tool. The tool, for example, may check the personal characteristics of a user requesting a search for a dataset and then limit the result set to only dataset carts and/or datasets with a scope encompassing that user's personal characteristics. In this way, fewer and more relevant results may be returned from a search for a dataset.

Such a selection method may be used, for example, by a data analyst who creates dataset carts containing datasets relevant to a project. The dataset selection tool may be used to select target datasets for multiple operations within the data processing system. In this way, the available datasets follow the data analyst throughout their work, ensuring that appropriate datasets are quickly and consistently selected.

The exact same computer-executable instructions need not be executed to implement a dataset selection tool for each operation for which one or more datasets are selected as a target. In some embodiments, a universal tool may be implemented to support this operation. In other embodiments, however, the dataset selection methodology may be implemented by different computer-executable instructions that perform the selection functions described above. When different computer-executable instructions are used to support dataset selection for different operations performed by the data processing system, each copy of the computer-executable instructions may render similar interfaces for consistency or ease of use. However, identical interfaces for selection of datasets for different operations is not a requirement.

Aspects of a data processing system may be implemented to achieve any one or more the foregoing objects and advantages. These objects and advantages may be used alone or together in any suitable combination.

Representative Data Processing System Supporting Dataset Carts

Dataset groups, such as dataset carts as described herein may be used in data processing systems that provide search interfaces through which a user may search for a dataset as a target of an operation. Those search interfaces may conduct searches that return, instead of or in addition to datasets, dataset groups/carts. Other interfaces may enable users to create or modify dataset groups/carts. Such a data processing system may include one or more components that maintain a repository of information about dataset carts, including their scope.

An exemplary data processing system may operate on logical datasets as well as physical datasets. Logical datasets may be defined, for example, based on schema including elements meaningful to the business of the enterprise, but independent of the physical representation of the data as stored. The logical dataset may correspond to a physical dataset.

Co-pending application titled "Dataset Multiplexer for Data Processing System," assigned U.S. patent application Ser. No. 17/588,965, which is hereby incorporated by reference in its entirety, describes a data processing system that enables operations to be specified on logical datasets while ensuring that those operations are applied to the appropriate physical dataset. This application describes that a dataset catalog is updated in response to events that impact the storage of the data associated with a logical dataset. Techniques as described herein for selection of datasets may be applied in a data processing system as described in that co-pending application.

Operations relating to the selection of datasets may be applied to logical datasets and/or physical datasets. For example, a logical dataset may be selected. Nonetheless, the selection may involve or be based on the corresponding physical dataset. Such a result may be achieved by, at the time of searching for a dataset to select, the dataset selection tool accessing the dataset catalog to identify the physical dataset corresponding to the logical dataset such that physical information can be obtained for the logical dataset and used in the dataset selection process.

Figure 1C:
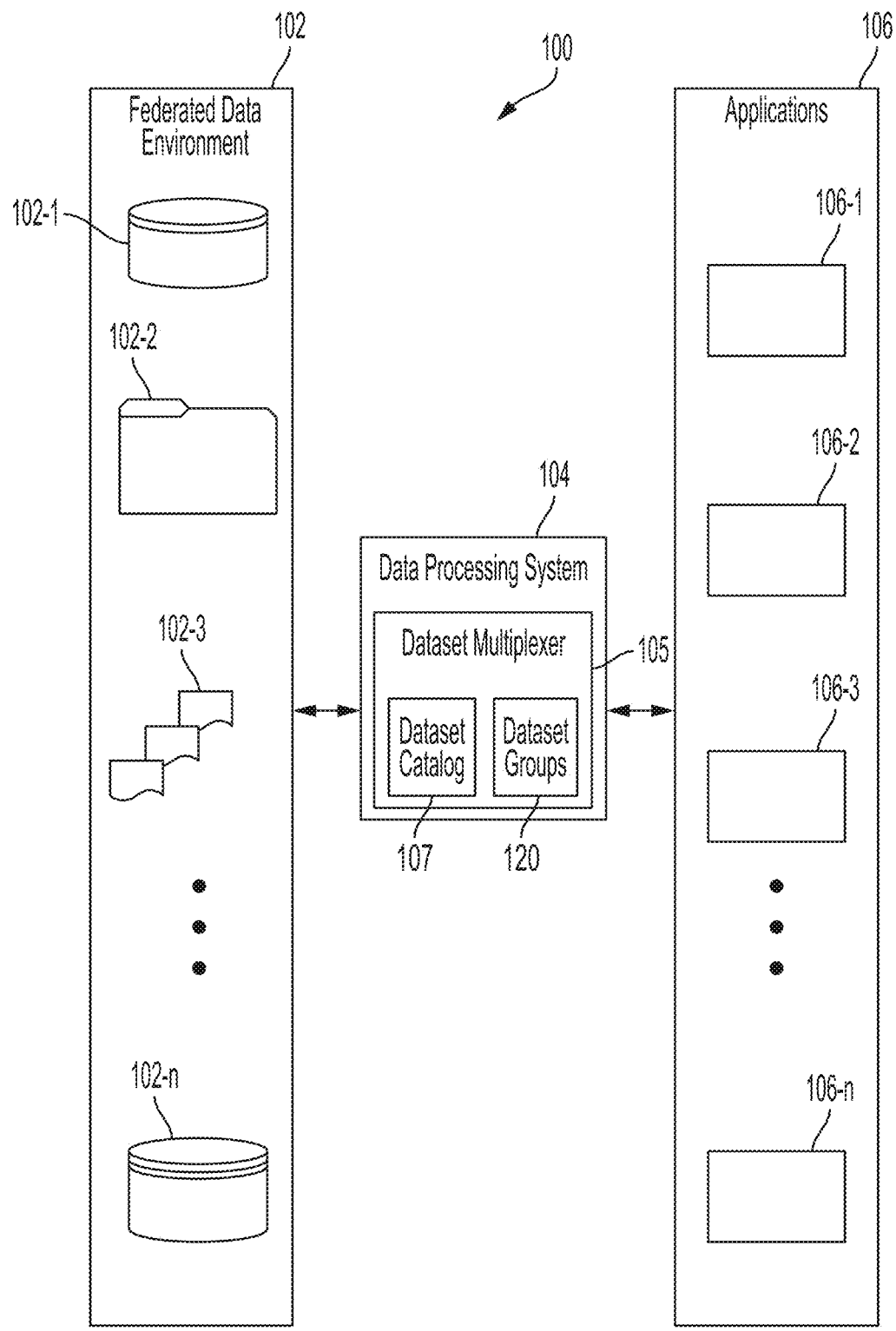
FIG. 1C is a block diagram of an exemplary enterprise IT system with a data processing system having a dataset catalog maintaining information on groups of datasets according to an aspect of the technology described herein.

FIG. 1C is a block diagram of an IT system 100 including an illustrative data processing system 104 and a dataset multiplexer 105 integrated with the data processing system 104. IT system 100, for example, may be an IT system of an enterprise, such as a financial company. For simplicity, elements of an enterprise IT system, such as networks, cloud storage, and user devices, are not expressly shown.

Data processing system 104 is configured to access (e.g., read data from and/or write data to) data stores 102-1, 102-3, 102-3, . . . , and 102-n. Each of the data stores 102-1, 102-3, 102-3, . . . , and 102-n, may store one or more physical datasets. A data store may store any suitable type of data in any suitable way. A data store may store data as a flat text file, a spreadsheet, using a database system (e.g., a relational database system), for example. Moreover, these data stores may be internal or external to the enterprise. External data stores, for example, may be "in the cloud," or otherwise in storage hardware managed by a third party. Accordingly, the data stores may provide a federated environment in which different data stores used by an enterprise may be in different locations and/or managed by different entities inside or outside the enterprise.

In some instances, a data store may store transactional data. For example, a data store may store credit card transactions, phone records data, or bank transactions data. It should be appreciated that data processing system 104 may be configured to access any suitable number of data stores of any suitable type, as aspects of the technology described herein are not limited in this respect. A data store from which data processing system 104 may be configured to read data may be referred to as a data source. A data store to which data processing system 104 may be configured to write data may be referred to as a data sink. However, techniques as described herein may be applied to data stores holding other types of data that are used in an enterprise.

Each data store may be implemented with one or multiple storage devices and may include data management software or other control mechanism to support the storage of physical datasets in one or more formats of any suitable type. The storage device(s) may be of any suitable type and may include, for example, one or more servers, one or more disc arrays, one or more clusters of disk arrays, one or more portable storage devices, one or more non-volatile storage devices, one or more volatile storage devices, and/or any other device(s) configured to store data electronically. In embodiments where a data store includes multiple storage devices, the storage devices may be co-located in one physical location (e.g., in one building) or distributed across multiple physical locations (e.g., in multiple buildings, in different cities, states, or countries). The storage devices may be configured to communicate with one another using one or more networks of any suitable type, as aspects of the technology described herein are not limited in this respect.

The data management software may organize the data in physical storage and provide a mechanism to access the data such that data may be written to or read from physical storage. The data management software may be, for example, a database system or a file management system. Depending on the type of data management software, the storage device(s) may store physical datasets using one or more formats such database tables, spreadsheet files, flat text files, and/or files in any other suitable format (e.g., a native format of a mainframe). In some embodiments, the data stores 102-1, 102-2, 102-3, . . . , and 102-n may be of a same type (e.g., all may be relational databases) or different types (e.g., one may be a relational database while another may be a data store that stores data in flat files). When the data stores are of different types, the storage environment may be referred to as a heterogenous or federated data environment 102. A data store may be, for example, a SQL server database, an ORACLE database, a TERADATA database, a flat file, a multi-file data store, a HADOOP distributed database, a DB2 data store, a Microsoft SQL SERVER data store, an INFORMIX data store, a table, collection of tables or other subpart of a database, and/or any other suitable type of data store, as aspects of the technology described herein are not limited in this respect.

Data processing system 104 supports a wide variety of applications 106 to perform functions that access (e.g., read and/or write access) physical datasets stored in data stores 102-1, 102-3, 102-3, . . . , and 102-n. Applications 106 may then perform operations based on data in the data stores. Data processing system 104 may support applications 106-1, 106-2, 162-3, . . . , and 106-n that may be of a same type or different types. In some instances, an application may, when executed, read or write transactional data to or from one or more physical datasets in a data store. In other instances, an application may, when executed, read or write data to or from physical datasets stored across different data stores and analyze the data in order to extract business insights from the datasets.

Applications 106 may be developed as data flow graphs. A dataflow graph may include components, termed "nodes" or "vertices," representing data processing operations to be performed on data and links between the components representing flows of data. Techniques for executing computations encoded by dataflow graphs are described in U.S. Pat. No. 5,966,072, titled "Executing Computations Expressed as Graphs," which is incorporated by reference herein in its entirety. An environment for developing applications (e.g., computer programs) as data flow graphs is described in U.S. Pat. Pub. No.: 2007/0011668, titled "Managing Parameters for Graph-Based Applications," which is incorporated by reference herein in its entirety. The dataflow graph may include data sources and data sinks. These are represented by terminal nodes in the flows that signify access to a data store 102-1, 102-3, 102-3, . . . , or 102-n.

However, the application itself need not be programmed with the specific data store included in the application. Rather than being hard coded to access a single physical dataset, applications 106 may be programmed in terms of logical datasets. A logical dataset may refer to a logical representation of one or more datasets. The data processing system 104 may store definitions of multiple logical datasets as well as other metadata about those logical datasets. This information may be managed by the data multiplexer 105. Tools used with data processing system 104 may access metadata about logical datasets and perform functions based on that metadata. For example, a program development environment may provide a user interface through which available logical datasets may be selected and used in programming an application.

A logical dataset may have a schema that defines data independently of the format of the corresponding data in a physical data store. A logical dataset, for example, may have a schema that defines logical entities in the logical dataset. The logical entities may be recognizable and/or understandable to a human user. For example, a logical dataset may include a logical entity such as customer name. In a physical dataset corresponding to this logical dataset, a customer name might be stored as three fields in a row of a data table, holding data corresponding to the customer's first name, middle initial and last name, respectively. The logical dataset, however, may simply include a logical entity Customer_Name without regard to the format of the data in physical storage.

Data processing system 104 may include an interface (not shown) through which a schema for a logical dataset may be defined. The interface, for example, may be a user interface through which a user may specify or otherwise introduce into the system a logical dataset by specifying its schema. The data processing system 104 may store a set of logical entities that are commonly used in the business of the enterprise. Examples of commonly used logical entities may include one or more of a name, identification number, phone number, address, country of citizenship, account balance, transaction amount, or date. Those business terms may be used to specify, at least partially, the schema of the logical dataset. However, the schema may be defined as including, instead or in addition to predefined logical entities, and other logical entities.

Enabling programing of applications in terms of logical datasets avoids the need for the programmer creating the application to understand the format of the data store storing the corresponding physical data set. As a result, a data analyst might develop applications using logical datasets, even if that data analyst does not understand the format of data within the data stores holding the physical datasets.

As a more detailed example, within an enterprise a programmer may define a logical dataset storing new customers. The schema for the logical dataset may include logical entities, such as customer name, customer address, customer identifier, and date of customer acquisition, for example. The data analyst may write the application in terms of the logical dataset and these logical entities, regardless of the storage format of the physical dataset corresponding to the logical dataset. As a result, the data analyst may write the application without knowledge of the physical dataset storing data to be accessed by the application.

At the time of execution of the application, data in a physical dataset corresponding to the logical dataset may be stored in one or more of the data stores 102-1, 102-3, 102-3, . . . , and 102-n. To execute the application, each operation specifying access to the logical dataset may be executed by data processing system 104 reading or writing data from the corresponding physical dataset stored in one of data stores 102-1, 102-3, 102-3, . . . , and 102-n. Dataset multiplexer 105 may enable automated execution of such operations by automatically accessing the corresponding physical dataset and converting between the format of data as stored in the physical data store and the format as specified in the schema for the logical dataset.

As shown in FIG. 1C, data processing system 104 includes dataset multiplexer 105 for automating access to a corresponding physical dataset and conversion between the format for the logical and physical data sets. Dataset multiplexer 105 may maintain a catalog of datasets 107, where each entry in the catalog corresponds to a logical dataset and provides information for accessing one or more physical datasets. For example, a catalog entry may identify a dataset in a data store 102-1, 102-3, 102-3, . . . , or 102-n corresponding to the logical dataset. The catalog entry may alternatively or additionally include information for converting data as stored in the physical dataset to a format of the logical dataset. That information may be or may include an executable program. For example, catalog information may identify a program for converting data in multiple fields in a physical dataset to the format of a corresponding logical entity in the logical dataset. Other information may alternatively or additionally be stored as or reflected in the catalog information for accessing the one or more physical datasets.

Dataset multiplexer 105 enables applications 106 to seamlessly access physical dataset(s) based on the programmed logical dataset(s) using the information in the catalog of datasets. Upon execution of an operation to access (e.g., read and/or write) a logical dataset in an application (e.g., application 106-3), dataset multiplexer 105 of the data processing system 104 may enable access to a corresponding physical dataset(s) in a data store (e.g., data store 102-1). For example, when the catalog information stored for the logical dataset is or includes an access control program, that program may be executed. As a result, even though application 106-3 is programmed in terms of a logical dataset, when data access operations are executed, a physical dataset stored in data store 102-1 is accessed.

The dataset multiplexer 105 may access its catalog of datasets to select an entry associated with the logical dataset referenced in application 106-3. The information for identifying the physical dataset stored in the appropriate data store 102-1 and/or converting data in the format of data store 102-1 to the format of the logical dataset may then be used for data access.

This access may be dynamic. The catalog information may be used at the time of execution of an operation in the application that requires data access. The entry associated with the logical dataset in the catalog of datasets may be updated in response to an event indicating a change to the storage of information associated with the logical data set. Access of the physical datastore via the catalog information may ensure that the application continues to execute despite changes that might be made at any point throughout the IT system 100, even if the data analyst or other user who wrote application 106-3 was unaware of those changes.

For example, a physical dataset may be migrated from data store 102-1 to data store 102-n. The logical dataset that the application is programmed with need not be modified to account for this change. By updating the catalog entry for the logical dataset, the dataset multiplexer 105 may automatically utilize the updated catalog information to provide application 106-3 access to the correct physical dataset regardless of the data store in which it resides.

Regardless of the manner in which specific data stores are accessed as part of an operation relating to access to a dataset, a user may provide input that specifies which datasets are the targets for specific operations. In a data processing system in an enterprise with a large number of datasets, one or more search interfaces may be provided to enable specification of an appropriate dataset. A dataset selection tool, for example, may provide a user interface providing interface elements configured to receive input specifying dataset search and selection commands.

Information enabling searching for datasets and operations on dataset groups may be stored within IT system 100. In this example, that information may be stored within dataset multiplexer 105, which may contain one or more metadata repositories. The metadata repositories may store information about logical and/or physical datasets with different types of metadata providing facets for searches to be performed for datasets. This metadata may be gathered using manual or automated techniques, including techniques as are known in the art.

In addition, one or more repositories may store information about dataset groups. Dataset group repository 120, for example, is shown in FIG. 1C holding such information. This information may be stored in nonvolatile, computer-readable media in a way that associates multiple types of information. Related information, for example, may be stored in the same data structure or may be related through links, for example.

This information may be shared among multiple users of a data processing system. As a result, different users may create, modify and/or access information about dataset groups. The information may be scoped such that information about each dataset group can be exposed only to users with persona within the scope for the dataset group. Alternatively or additionally, the repository that stores information about dataset groups may implement access restrictions, restricting which users can create, modify and/or access some or all of the dataset groups.

The restrictions on access to information in the repository may parallel the scope restrictions on access to the dataset groups. Access may be granted to users to create or modify dataset groups with a scope personal to the user. Alternatively or additionally, access may be granted to users in a group, who have a role and/or who have other characteristics as part of their persona within the scope of the dataset group. In some embodiments, however, privileges to create and modify dataset groups may be set separately from the scope for use of those dataset groups. Different access controls for managing and using dataset groups may enable capturing expertise of a subset of the workers in an enterprise and automatically promulgating that expertise through the data processing system. Users with expertise about appropriate datasets to use in certain operations, for example, may be given access privileges to create or modify dataset groups scoped for use by specifically listed users, users with specific roles or users in groups within the enterprise that perform those operations. When other users perform those operations by selecting datasets from dataset groups for which their persona is within the scope, the system may automatically limit their choices for datasets to those previously designated by users with expertise on the data.

Regardless of how access is implemented, data processing system 104 may provide user interfaces through which dataset groups are created or modified, searches returning dataset groups are conducted, and/or datasets are selected from dataset groups. Examples of such user interfaces are provided in the following sections.

Representative User Interfaces for Selecting Logical Datasets Based on Groups

Dataset groups may be available for use in selecting one or more datasets for performing an operation relating to data access. For example, in connection with selection of a dataset for use in performing an operation, a search interface may be presented, and dataset groups may be among the search results.

As one example, an application for execution by the data processing system may be configured based on user input to access a particular dataset. Dataset carts may be used to simplify this selection process. In embodiments where the application is configured as a dataflow graph, a dataset component of the dataflow graph may be configured as a data source to perform a read operation. Configuration may entail searching for a dataset and selecting an appropriate dataset. Including dataset carts in the search results may simplify the search. For example, datasets matching the search query that are within a dataset cart are not separately presented as a search result. Rather, the search results may be limited by presenting the dataset carts.

Figure 2A:
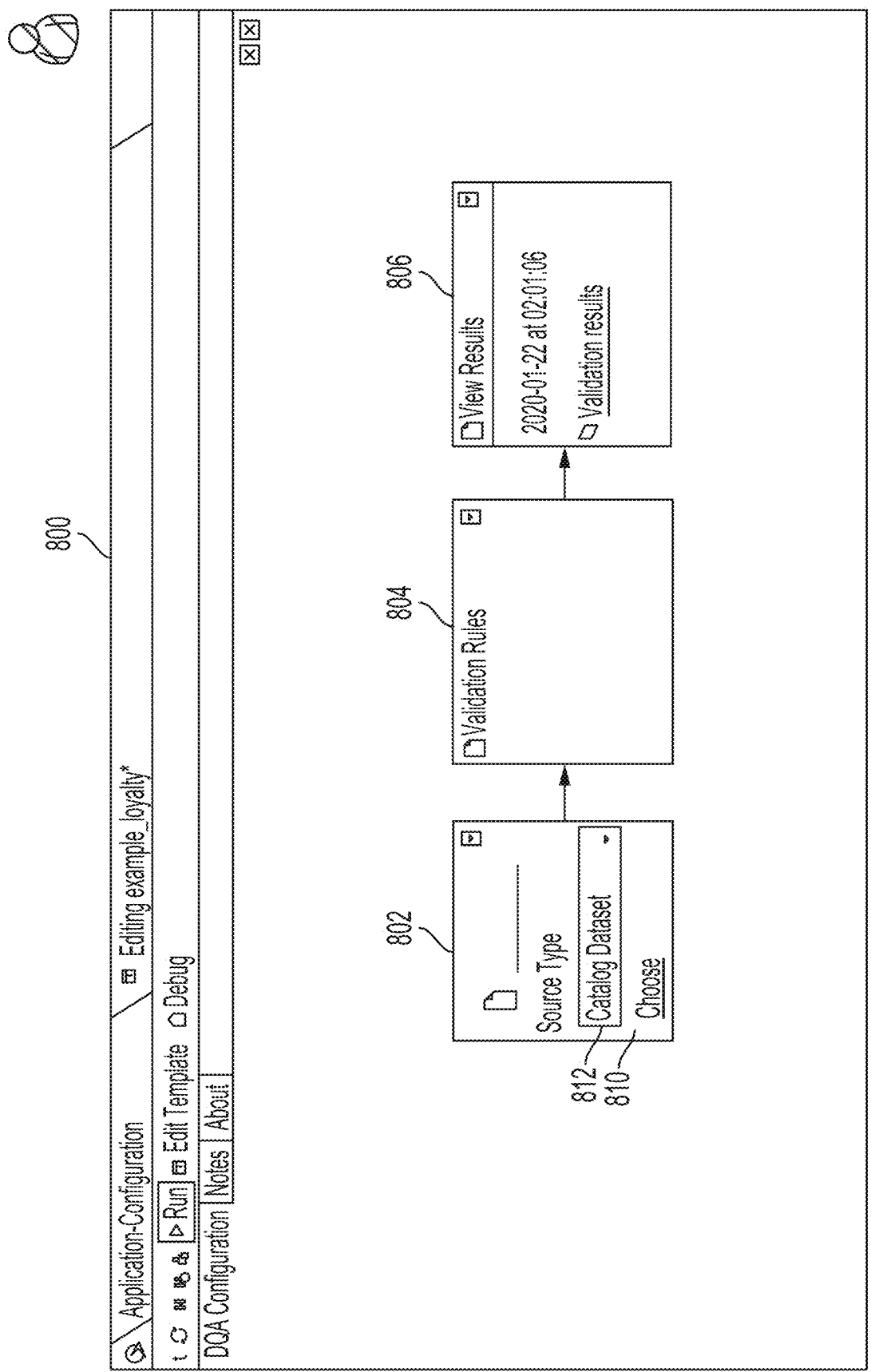
FIG. 2A is an illustration of a simplified exemplary graphical user interface, rendered by a data processing system, through which a user may specify components and interconnections among components of an executable dataflow graph.

FIG. 2A illustrates GUI 800 in a programming environment in which a dataset cart may be used to aid a user selecting a dataset to configure an application. In this example, a user such as user 112*a* or 113*a* of FIG. 1A, may specify through GUI 800 components and interconnections among components of an executable dataflow graph. Those components may represent one or more input sources, one or more output sources and one or more operations that are performed on data from inputs to generate outputs. Components representing input and/or output sources may be configurable by the user. Configuration may entail specifying a dataset to use for input or output. Configuration of these components may entail user input that first selects a dataset cart and then selects a dataset within the selected dataset cart.

FIG. 2A illustrates a simple graph, with some of the information that may be displayed and interface elements associated with the displayed components omitted for simplicity of illustration. In this example, a user has specified a component 804 to process an input dataset. Component 804 may represent, for example, operations applying data quality rules to a selected input dataset.

Component 802 represents a data source containing the input dataset. Component 802 has interface elements which a user may access to configure the component, including by first selecting a dataset cart and then selecting a dataset within that cart to be used as the input data source. Component 806 represents an output component, which a user might configure to specify, for example, an output dataset that may be created to hold the data created in operations represented by component 804.

As shown in FIG. 2A, component 802 includes user interface elements through which a user may interact with a selection tool for selection of a dataset. Those interface elements may include field 812, which here is illustrated as a drop-down menu box. In the state shown in FIG. 2A, a user has selected within field 812 a value indicating that user wishes to select a dataset in the dataset catalog. Link 810 is another user interface element through which a user may input a command to proceed to the next step in the selection process of choosing a dataset from the options in the dataset catalog available to the user.

Figure 2B:
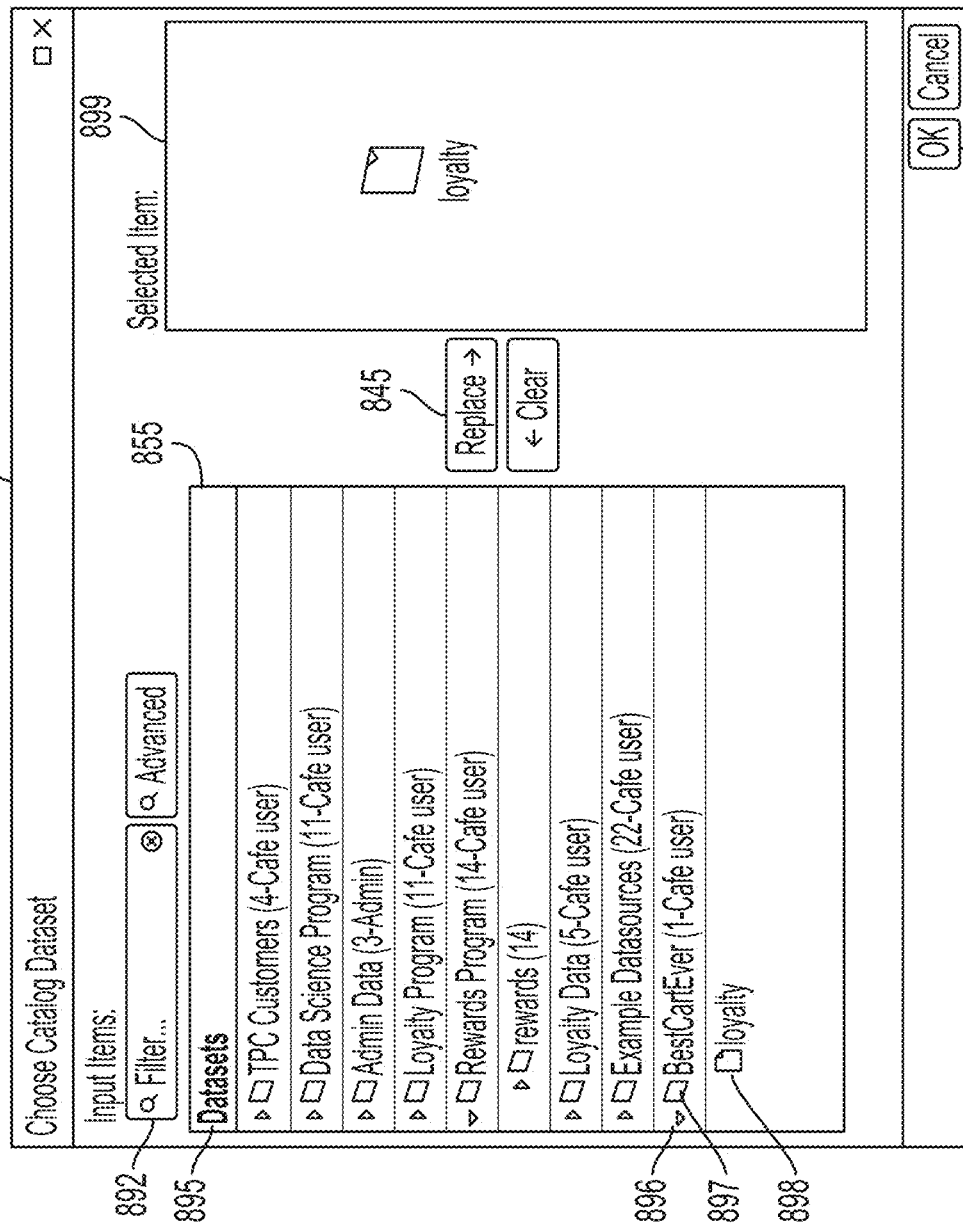
FIG. 2B is an illustration of the exemplary graphical user interface of FIG. 2A in an operating state in which the user has accessed a dataset selection tool to select a dataset as a step in a process of configuring a component of the executable dataflow graph to access a dataset.

In response to user selection of link 810, the data processing system may generate and present GUI 890 of FIG. 2B to the user. FIG. 2B illustrates an interface of a selection tool for selection of a dataset, which in this case is being invoked as part of the process of selecting a dataset to configure component 802 of the dataflow graph of FIG. 2A. Within GUI 890, available catalog datasets are presented, consistent with the user's selection of that source type, as described above in connection with FIG. 2A.

GUI 890 presents, in portion 855, dataset carts containing datasets that are available for selection. If datasets, not within dataset carts, were available for selection, those datasets might also appear in list 895. The list 895 in the GUI 890 includes, among other dataset carts, the dataset cart (e.g., "BestCartEver") created through GUI 400 of FIG. 8A, for example.

In this example, the search results are presented to preserve a hierarchy of datasets. Icons presented next to the elements in the list 895 indicate whether an element is a dataset cart or a dataset. For example, an element with a "folder" icon 897 depicted next to it may be a dataset cart and an element with a different icon 898, here shown as a file icon, may be a dataset. Navigational graphical user interface elements are provided to enable a user to traverse the hierarchy, such as by showing or hiding the contents of the groups of datasets represented by the "folder" icons. In the example of FIG. 2B, GUI 890 includes a navigational graphical user interface element 896. Selection of element 896 causes GUI 890 to toggle between presenting and hiding datasets (e.g., logical datasets) contained in the dataset cart. In this way, the user may identify and select an icon at an appropriate level of the hierarchy.

Though FIG. 2B illustrates a hierarchy of only two levels, in some scenarios, a group may contain further groups, and, if a dataset cart that contains further dataset carts is expanded, the user may be presented an interface with the inner group associated with a user interface element providing the user the option to expand in the inner group, too. In this way, a multi-level hierarchy may be exposed. Regardless of the number of levels of the hierarchy presented to the user, the user may navigate the levels of the hierarchy to reveal datasets available for selection and then select a desired dataset.

Figure 3:
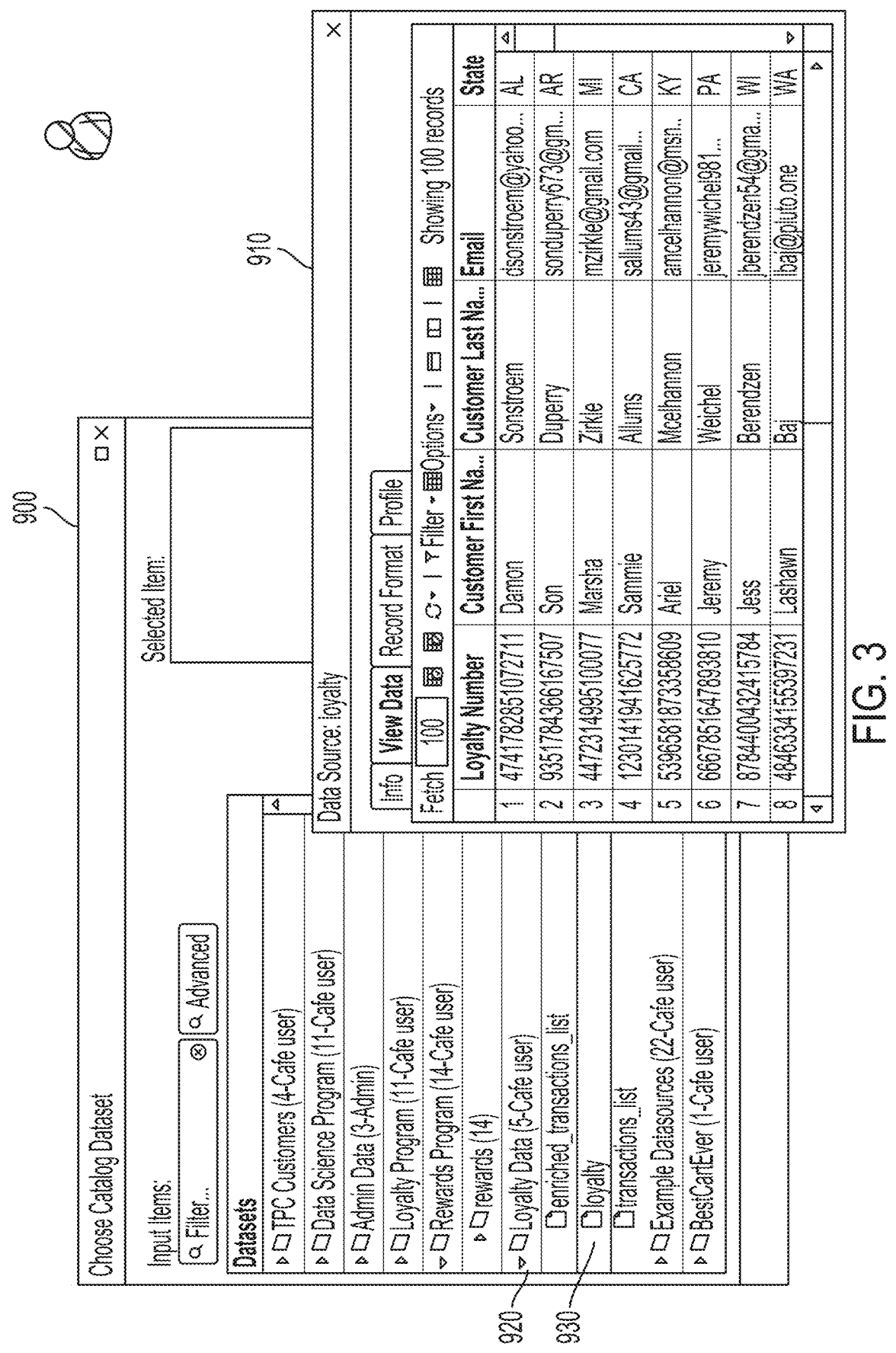

In addition, the user may provide input to obtain additional information about the datasets or dataset groups displayed via the interface. For example, GUI 900 of FIG. 3 depicts an operating state in which the user has manipulated user interface elements to control the dataset selection tool to expand certain dataset carts, including the "Loyalty Data" dataset cart 920, revealing the set of logical datasets contained in that dataset cart. GUI 900 enables a user to obtain additional information regarding a particular logical dataset by selecting the logical dataset 930 in GUI 900. For example, a pop-up GUI 910 may be presented in response to a user's request to view additional information about a logical dataset.

GUI 910 provides additional user interface elements that a user may manipulate to get additional information about a dataset. Selection of the "Info" tab in GUI 910 causes basic information about the logical dataset to be presented, such as, datastore related to the logical dataset, type of datastore or storage, path to the datastore and/or physical dataset in the datastore, link to the corresponding entry in the catalog of datasets, and/or other information. Selection of the "View" tab in GUI 910 causes physical data related to the logical dataset to be presented, such as data in the physical dataset corresponding to the logical dataset. Selection of the "Record Format" tab in GUI 910 causes record format information regarding a dataset to be presented (e.g., record format information regarding a logical dataset and/or logical entities of the logical dataset). Selection of the "Profile" tab in GUI 910 causes profile information, such as, relationships with other dataset carts and/or logical datasets defined in the system. A user may view any or all of this information to assess whether the dataset is appropriate for the desired use.

Figure 4A:
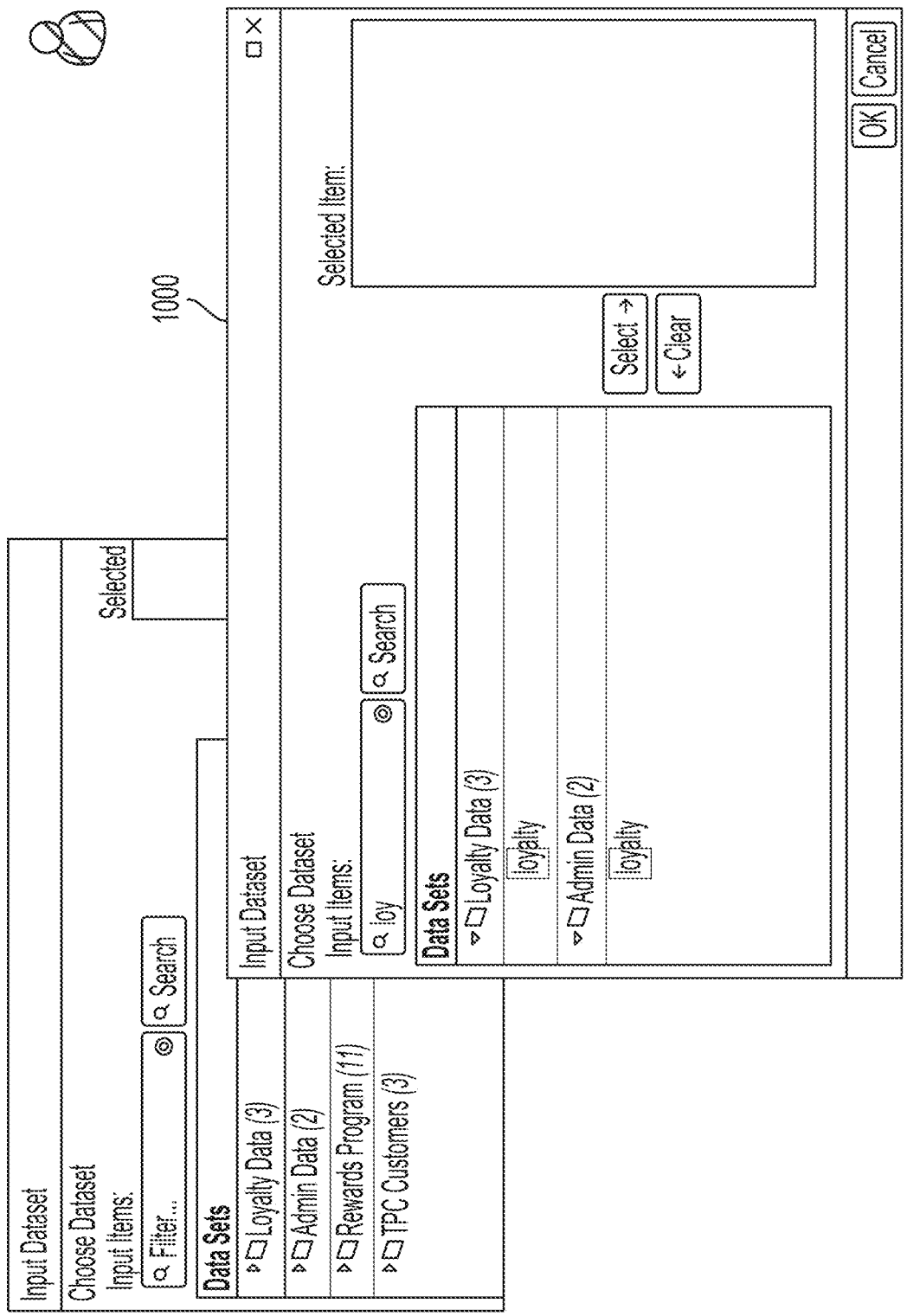
FIG. 4A is an illustration of an exemplary graphical user interface, rendered by a data processing system, through which a user may select a dataset, in which the user has navigated, through a directory of datasets as a first mechanism to limit the search and then entered as a search query text to appear in the description of a dataset as a second mechanism to limit the search.

Other mechanisms, such as a search interface, may be used to limit the number of dataset carts and/or datasets presented to the user as candidates for selection. Referring back to FIG. 2B, GUI 890 may enable a user to input a search query. GUI 890 may include graphical user element 892 for a user to input the search query. In this example, the search query is specified as text. The user may specify words entered in a repository to describe the dataset or the names of fields included within the dataset and/or other metadata stored for a dataset. For example, FIG. 4A depicts search results for search query "boy". The data processing system may execute a search based on the query and generate search results including a list of dataset carts and/or logical datasets selected by the data processing system based on the query. In this example, the search query matches the title of datasets within two dataset carts, and the list of datasets available for selection through GUI 1000 is limited to the dataset carts containing these two matching datasets.

Regardless of how the list 895 (FIG. 2A) is specified, the selection tool may present a user interface through which a user may make a selection from the list. In this example, user interface elements for selection are separate from the navigation user interface elements. Such a configuration enables selection of an entry in list 895 to have a level in the hierarchy of dataset groups appropriate for the context. In a scenario in which the operation for which a selection is to be made operates on a single dataset, the selection user interface elements may only be operational when the user has indicated a selection of an individual dataset. In scenarios in which selection of a dataset group is appropriate, the selection user interface elements may be operable when the user has indicated a dataset cart. If either a group or a single dataset is appropriate for the operation, the selection user interface elements may be operable when either a group or single dataset element is indicated. In the example of FIG. 2A in which a user is selecting a single dataset to configure a component of a graph, the selection tool may restrict selection to a level of the hierarchy showing individual datasets.

As shown in FIG. 2B, the "loyalty" dataset has been designated as the selection. This may have been achieved by selection of GUI element 898 followed by selection of GUI element 845, which caused the "loyalty" dataset to be presented in portion 899 of GUI 810. Selection of GUI element 870 causes the dataset identified in portion 899 to be returned by the selection tool as the user selection for use in performing the operation of data access. A user, for example, may designate a dataset that appears listed in portion 899. From there, a user may call up information on that dataset, as described above, and make a final determination whether the designated dataset should be selected. Other user interface elements may enable a user to modify the designated dataset before the selection tool returns a selection, including an interface element labeled "Clear," that removes any dataset designated in portion 899 or a "Cancel" interface element that ends the selection process without making a selection.

In this example, the search interface is noticeably simpler than the search interface in FIG. 10A, presenting fewer fields for specifying search criteria. Even with a simpler search interface, the results may be equally or more relevant than those a user might find through the interface of FIG. 10A, because the results may be limited to those within dataset carts with a scope encompassing the user and/or other context of the search.

Figure 2C:
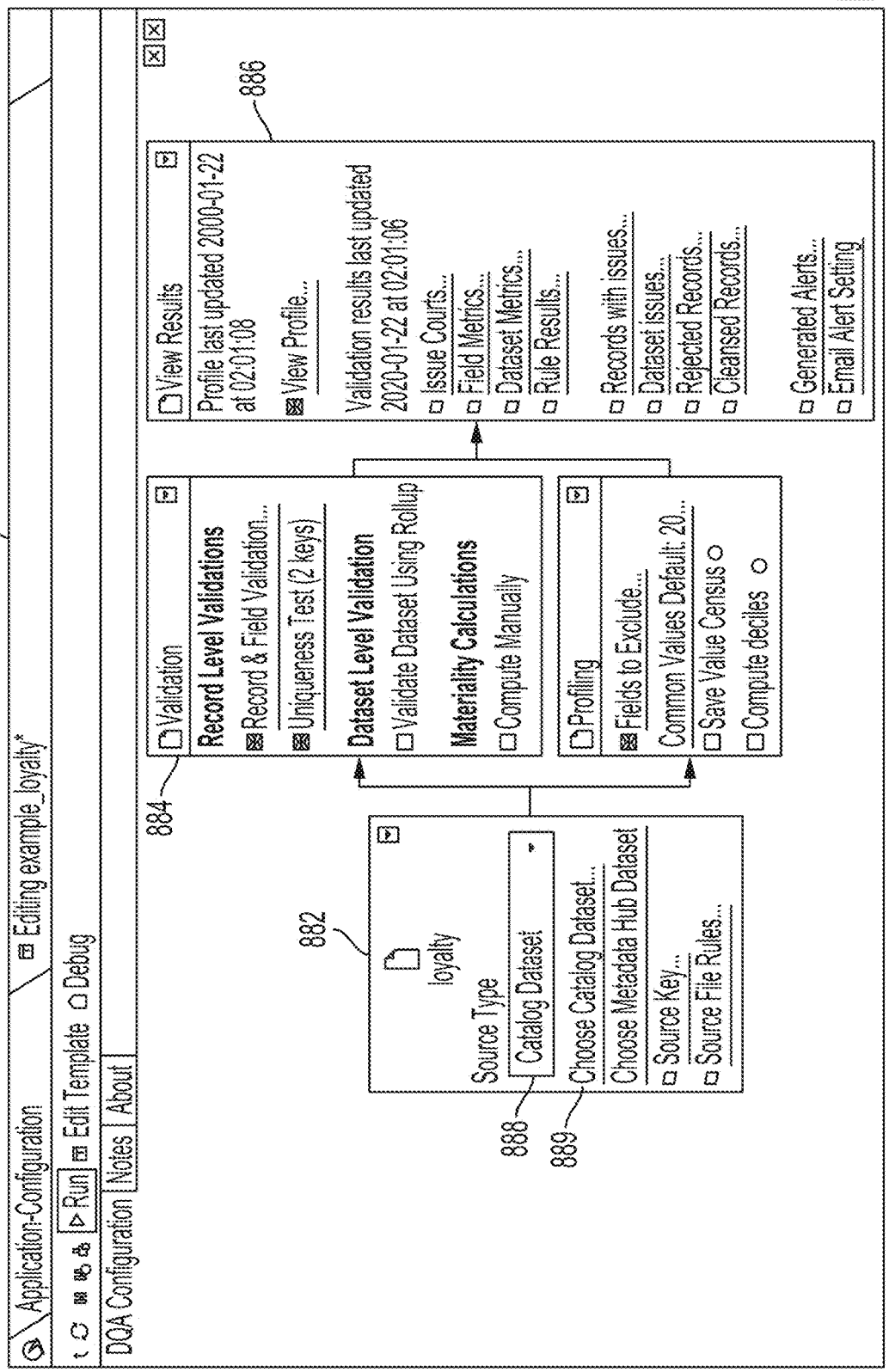
FIG. 2C is an illustration of the exemplary graphical user interface of FIG. 2A with additional elements of the user interface depicted.

The value of simplifying the selection process may be seen in connection with FIG. 2C, which shows more of the information and user interface elements that may be present, even for the simple example of FIG. 2A. FIG. 2C illustrates GUI 875 in a programming environment in which a dataset selection may be made. In this example, a user, such as user 112a or 113a of FIG. 1A, may specify through GUI 875 components and interconnections among components of an executable dataflow graph. For example, a user may specify a component to perform validation or apply data quality rules to data. The dataflow graph may include a component 882 indicating a dataset is to be used. The component may be configured to identify which dataset is to be used for data access operations associated with that component.

FIG. 2C illustrates a scenario in which the operation(s) 884 include execution of data quality rules on the selected data source. Component 886 of the dataflow graph may represent an output of the validation operation(s).

As shown in FIG. 2C, a dataset, such as, loyalty.dat, whose contents are to be validated may be selected through user interface elements associated with component 882. Those interface elements may include field 888, which here shows that a user has selected a value indicating that the data source to be selected is limited to one registered in dataset catalog 107 (FIG. 1C). Link 889 is another user interface element which a user may invoke to input further search criteria.

Selection of link 889 may trigger a selection tool to present a user interface, such as GUI 890 described above in connection with FIG. 2B, through which a user may select a dataset. In this example, the "loyalty" dataset is depicted as the selected dataset in component 882 of FIG. 2C. Despite the additional complexity of the interface of FIG. 2C relative to that of FIG. 2A, this dataset may have been selected through a dataset selection tool, with a simple process for selection of that dataset.

Figure 2D:
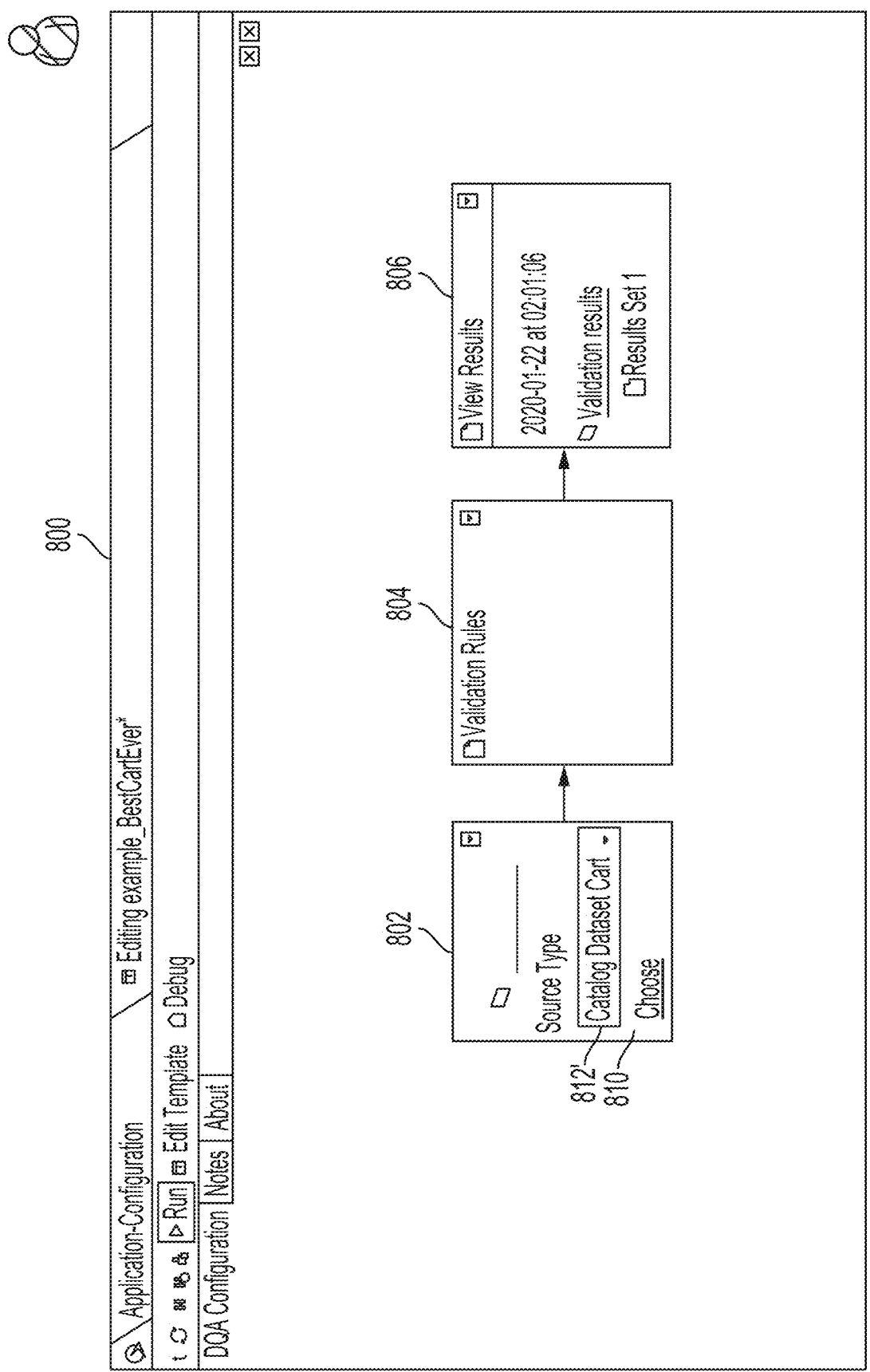
FIG. 2D is a simplified exemplary graphical user interface, rendered by a data processing system, through which a user may specify components and interconnections among components of an executable dataflow graph.

A similar simple process may be used to specify multiple datasets for which the same operation is to be performed. For example, the graph, as shown in FIG. 2A that applies validation rules may be configured to apply those validation rules to multiple data sets. FIG. 2D illustrates GUI 800 in an operating state in which component 802 has been configured to represent multiple datasets. In this example, that configuration has been achieved by user input in field 812' indicating selection of a catalog dataset cart as the source type.

Figure 2E:
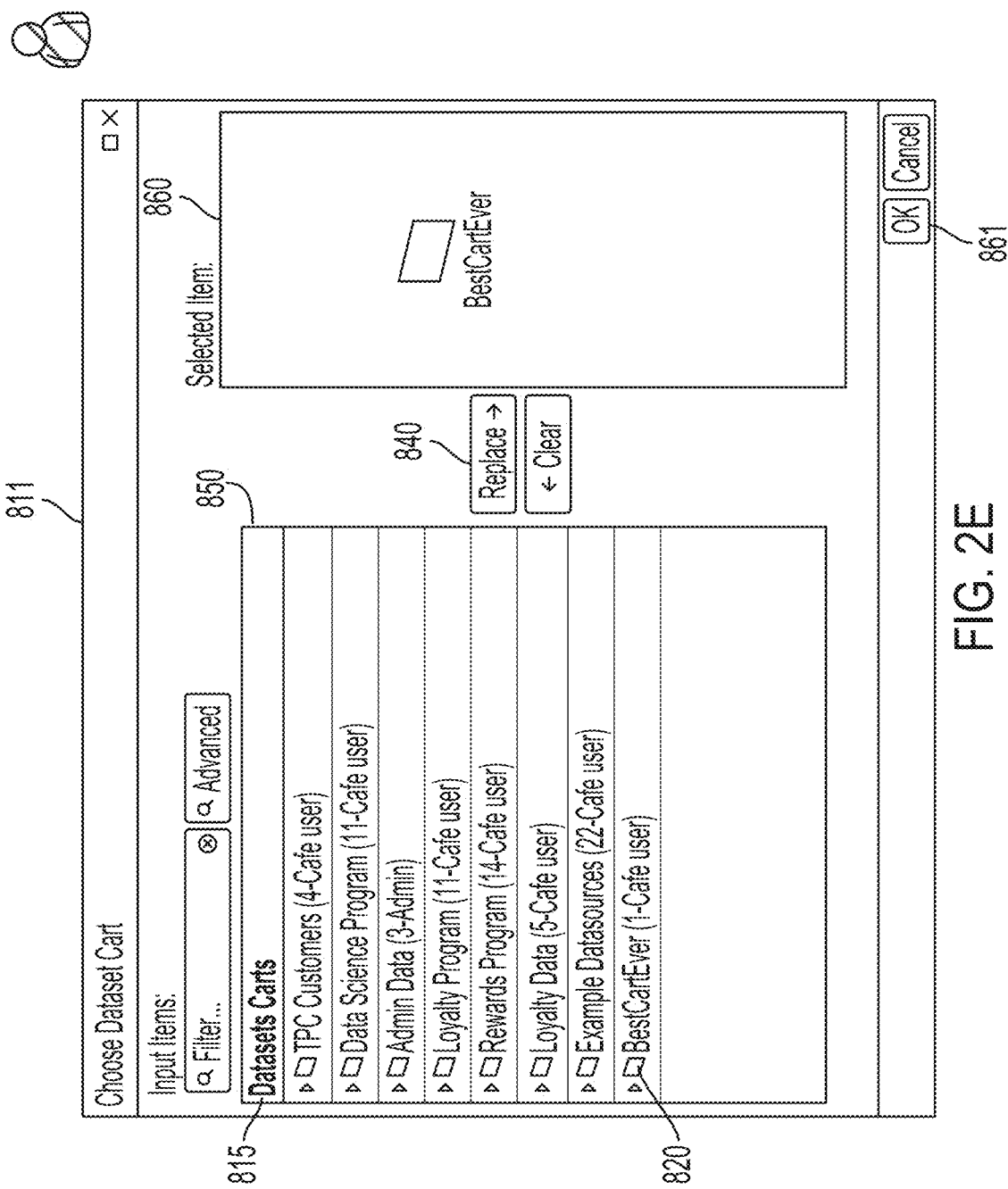
FIG. 2E is an illustration of the exemplary graphical user interface in an operating state in which the user has accessed a dataset selection tool to select a dataset cart as a step in a process of configuring a component of the executable dataflow graph.

Regardless of the source type for configuring a component that represents data input or output, a data selection tool may be used to receive user input selecting the dataset or group of datasets. In scenarios in which a dataset is being selected in a context in which an operation might be performed on multiple datasets, the data selection tool may allow an entire dataset cart to be selected. The selection of a dataset cart may be performed as described above in connection with FIG. 2B, but user interface element 845 may operate when a dataset group is indicated in list 855. FIG. 2E provides an example user interface for a selection of a group of datasets.

Selection of a dataset group as a target of an operation may serve as a command to the data processing system to perform the operation on each dataset in the selected dataset cart. For example, the operation may include executing data quality rules on each dataset included in the dataset cart or other types of processing of the content of each dataset.

In the example of FIG. 2E, GUI 811 lists, in portion 850, dataset carts that are available for selection. The list 815 in the GUI 811 includes, among other dataset carts, the dataset cart (e.g., "BestCartEver") created through GUI 400 of FIG. 8A. The user may make a selection from the list. As shown in FIG. 2E, the "BestCartEver" dataset has been designated as the selection. This may have been achieved by selection of GUI element 820 followed by selection of GUI element 840, which caused the "BestCartEver" dataset cart to be presented in portion 860 of GUI 811. Selection of GUI element 861 causes the "BestCartEver" dataset cart to be selected for use in performing the operation of data access.

Thus, a selection tool as described in these examples provides information and user interface elements that enables a user to efficiently make a selection from among myriad choices.

Selection interfaces may include other user interface elements to identify a dataset or group of datasets for selection. For example, the user interface may accept as input other search criteria to enable a user to identify a relevant dataset for an operation involving accessing one or more datasets or dataset carts. The options presented to the user, whether datasets or dataset carts, may be limited to those matching the specified search criteria. In the case of a dataset cart, the options presented may be limited to those containing datasets matching the search criteria and/or carts matching the specified criteria. FIG. 4A is an illustration of an exemplary graphical user interface 1000, rendered by a data processing system, through which a user may select a dataset, in which the user has navigated, through a directory of datasets as a first mechanism to limit the search and then entered as a search query text, such as, "boy" to appear in the description of a dataset as a second limitation on the search. The user may then select a dataset cart and/or dataset for use in performing the operation from the filtered search results.

In this example, even though additionally flexibility is provided in specifying the object of a search, the search interface is noticeably simpler than the search interface in FIG. 10A, presenting fewer fields for specifying search criteria. Even with a simpler search interface, the results may be equally or more relevant than those a user might find through the interface of FIG. 10A, because the results may be limited to those within dataset carts with a scope encompassing the user and/or other context of the search.

FIG. 4B is an illustration of the exemplary graphical user interface of FIG. 4A, rendered by a data processing system, through which a user may select a dataset, in an operating state after the search query has been executed and a list of datasets is presented matching the search query (e.g., search query "boy") for the user to select one or more datasets as a target of an operation. The search results may be limited to datasets based on scope of the carts and the user executing the search.

FIG. 5 is an illustration of the exemplary graphical user interface 1100 rendered by a data processing system, through which a user may select a dataset, in an operating state after executing a search query limiting a list of datasets including a field storing an email. The search results may be limited to datasets based on scope of the carts and the user executing the search. For example, the search results may be limited to datasets in dataset carts for which the user executing the search is within the scope of the carts.

Various forms of user input may be used to determine an identity of the user using the data processing system for creating dataset carts, executing searches, and/or using or selecting datasets/carts as targets of operations. For example, user input, such as, textual input (e.g., user identifier and/or password) using a keyboard, stylus or other writing utensil, voice input using a microphone or other device, biometric input (e.g., fingerprints, facial patterns, voice patterns, etc.) and/or other forms of input may be utilized to determine an identity of the user. The identity information may be used to indicate a persona for the user.

Representative User Interfaces for Grouping Logical Datasets

A data processing system may provide one or more mechanisms by which a user may manage groups of datasets, such as by creating, modifying or deleting a group. The mechanism may be a dedicated tool contained within the data processing system or may be provided through additional user interface options associated with tools or other interfaces through which a user may access dataset information that are otherwise present in the data processing system. For example, an interface through which a user may search for datasets meeting specified criteria may include user interface elements through which a user may provide input associating a data set included in the search results with a dataset group. Likewise, other interfaces, such as where lineage information is being presented, may be augmented with user interface elements through which a user may manage dataset groups. These user interface elements may be linked to computer-executable code that accesses and/or modifies the stored information about dataset groups.

Figure 6:
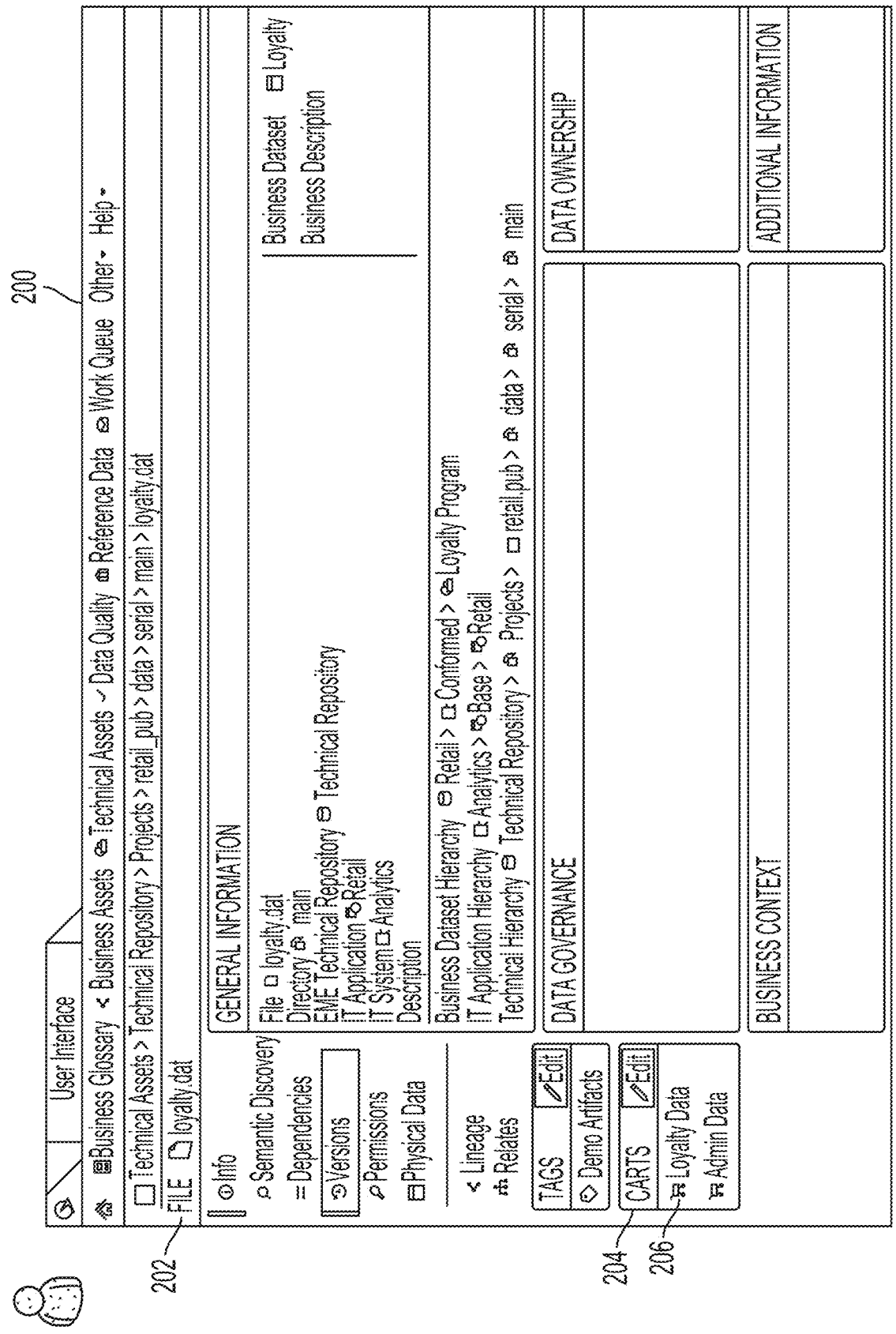
FIG. 6 is an illustration of an exemplary graphical user interface, rendered by a data processing system, through which a user may view or change information related to a dataset.

FIG. 6 illustrates a graphical user interface (GUI) 200 that is generated in response to a request to view information about a dataset and/or a dataset group, which in this example is depicted as a dataset cart. For example, this interface may be the result of a user providing input acting as a dataset search query and then selecting a particular dataset from the results. GUI 200 presents information about a dataset 202. As shown in FIG. 6, information regarding dataset "loyalty.dat" is presented. The information regarding the dataset 202 may include information regarding type of dataset (e.g., file, directory, table, etc.), the directory to which the dataset belongs, hierarchies of datasets to which the dataset belongs, and/or other information. For example, GUI 200 depicts that dataset 202 is a file, belongs to directory "main", and belongs to at least three hierarchies of datasets, such as "loyalty program", "retail", and "main". The hierarchies may be defined or specified by users of the data processing system 104.

The interface may also include interface elements through which dataset groups may be managed. In this example, GUI 200 also includes a listing of dataset carts 204 that contain the dataset 202. For example, the user interface 200 depicts that dataset carts "Loyalty Data" and "Admin Data" contain dataset 202. A request to view information about a dataset cart may cause another GUI to be generated. For example, selection of a graphical user element 206 representing the "Loyalty Data" dataset cart may cause GUI 300 to be generated.

Figure 7:
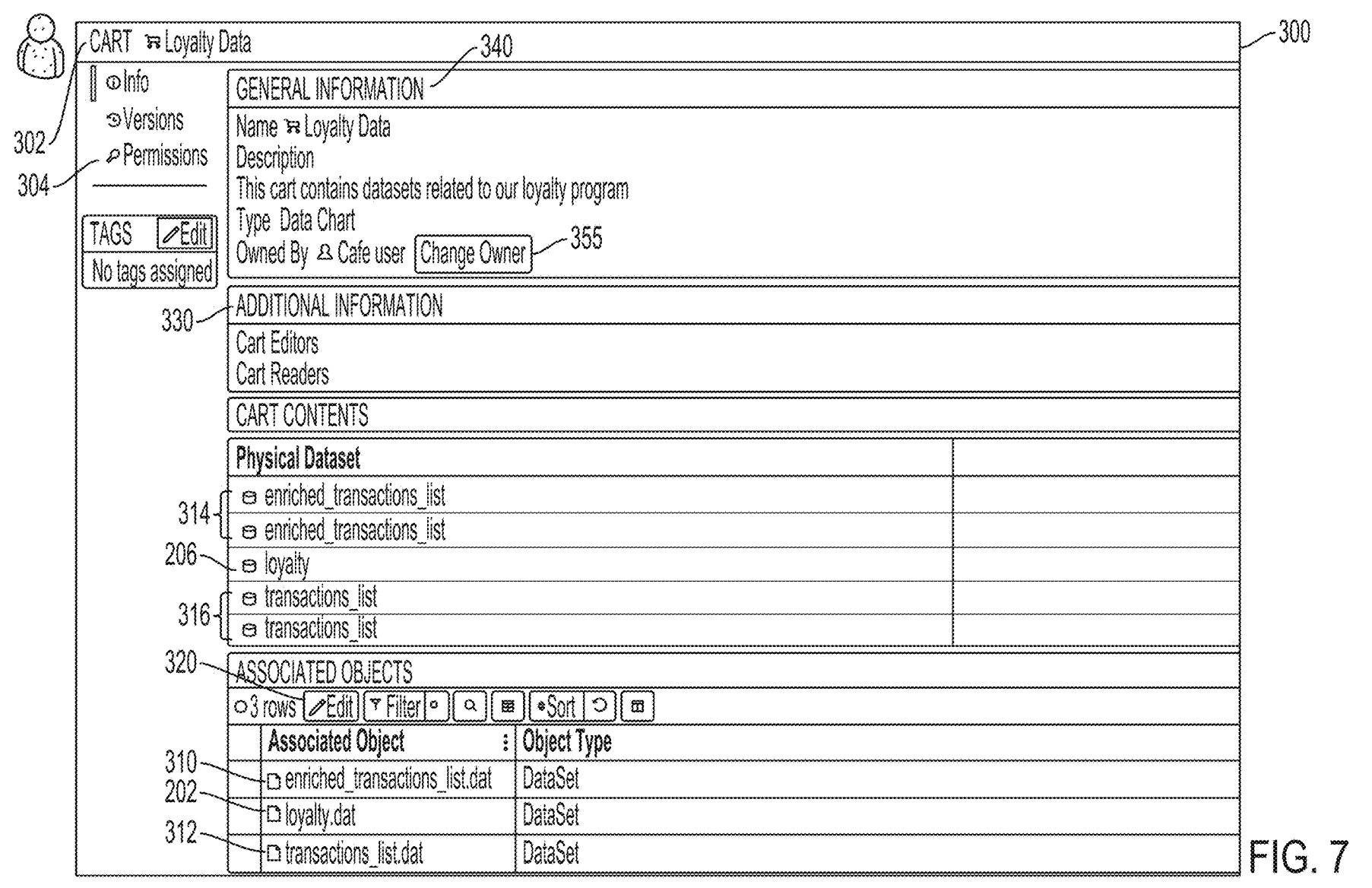

FIG. 7 illustrates an example GUI 300 that is generated in response to a request to view and/or change information about a dataset cart 302. It should be appreciated, however, that a data processing system may provide alternative or additional mechanisms by which a user may invoke an interface for managing a dataset cart as shown. In this example, GUI 300 presents information 340 regarding the "Loyalty Data" dataset cart. The information regarding the dataset cart 302 includes the name of the dataset cart, information describing the dataset cart, an owner of the dataset cart (e.g., a user who created the dataset cart), users who are granted permissions to modify the dataset cart (e.g., permissions to edit or delete the dataset cart), contents of the dataset cart (e.g., information regarding datasets included in the dataset cart), other dataset carts, logical datasets or logical entities associated with the dataset cart (e.g., having a relationship with the dataset cart), and/or other information. Information about users who are granted permissions to view the dataset cart, whether in conjunction with viewing information in repository 120 or in having the dataset cart appear in results of a search conducted by that user, can be entered by the user selecting user interface element 304. For example, GUI 300 depicts that dataset cart 302 includes a logical dataset "loyalty.dat" 202 and information 206 regarding the physical dataset corresponding to that logical dataset. As shown in GUI 300, the dataset cart 302 may include information regarding the physical datasets corresponding to other logical datasets included in the dataset cart. For example, dataset cart 302 contains logical datasets 310, 312 and information 314, 316 regarding physical datasets corresponding to these logical datasets.

GUI 300 includes interface elements configured to receive input that changes the dataset cart. Interface element 330, for example, when selected by a user may present an additional screen through which a user may specify users, as a list of individuals, by role, group membership or other characteristics of a user persona, that can read, edit, delete, etc. the dataset cart. A dataset cart may be assigned a current owner. The current owner may have full access to all aspects of the dataset cart. The current owner may, initially, be the user who created the dataset cart. The current owner of the dataset cart may thereafter delegate ownership to another user by selecting graphical user element 355 and indicating the user or role to whom ownership is to be delegated.

In some embodiments, the scope of the dataset cart may be commensurate with the users who are authorized to read and/or edit the dataset cart. In other embodiments, scope of the dataset cart, specifying the users for which the dataset cart can appear among results of a search performed for a dataset, may be specified separately. A separate mechanism may be provided in an interface such as GUI 300 to set the scope of a dataset cart. For example, user interface element 304 may, when selected by a user with authorization to edit a dataset, may render another display screen in which a user may enter the scope, such as be identifying specific users, groups, roles, etc.

Additionally or alternatively, other parameters may be used to define scope of the dataset cart. For example, a time parameter (e.g., time of day, day of week, month of year) may be used to define scope. In such a scenario, a data processing system may implement the time parameter of the scope by limiting selection of datasets and/or dataset carts for presentation to a user searching for a dataset to only those datasets or dataset carts that are approved for use at the time the search is initiated.

A dataset cart 302 may be updated via GUI 300. For example, selection of graphical user element 320 may enable a user with edit permission to add or delete datasets from the dataset cart 302.

In some instances, a user, such as user 111*a* of FIG. 1A may request to view and/or change information about a dataset or dataset cart via interfaces 200, 300 in order to define or create dataset carts.

Figure 8A:
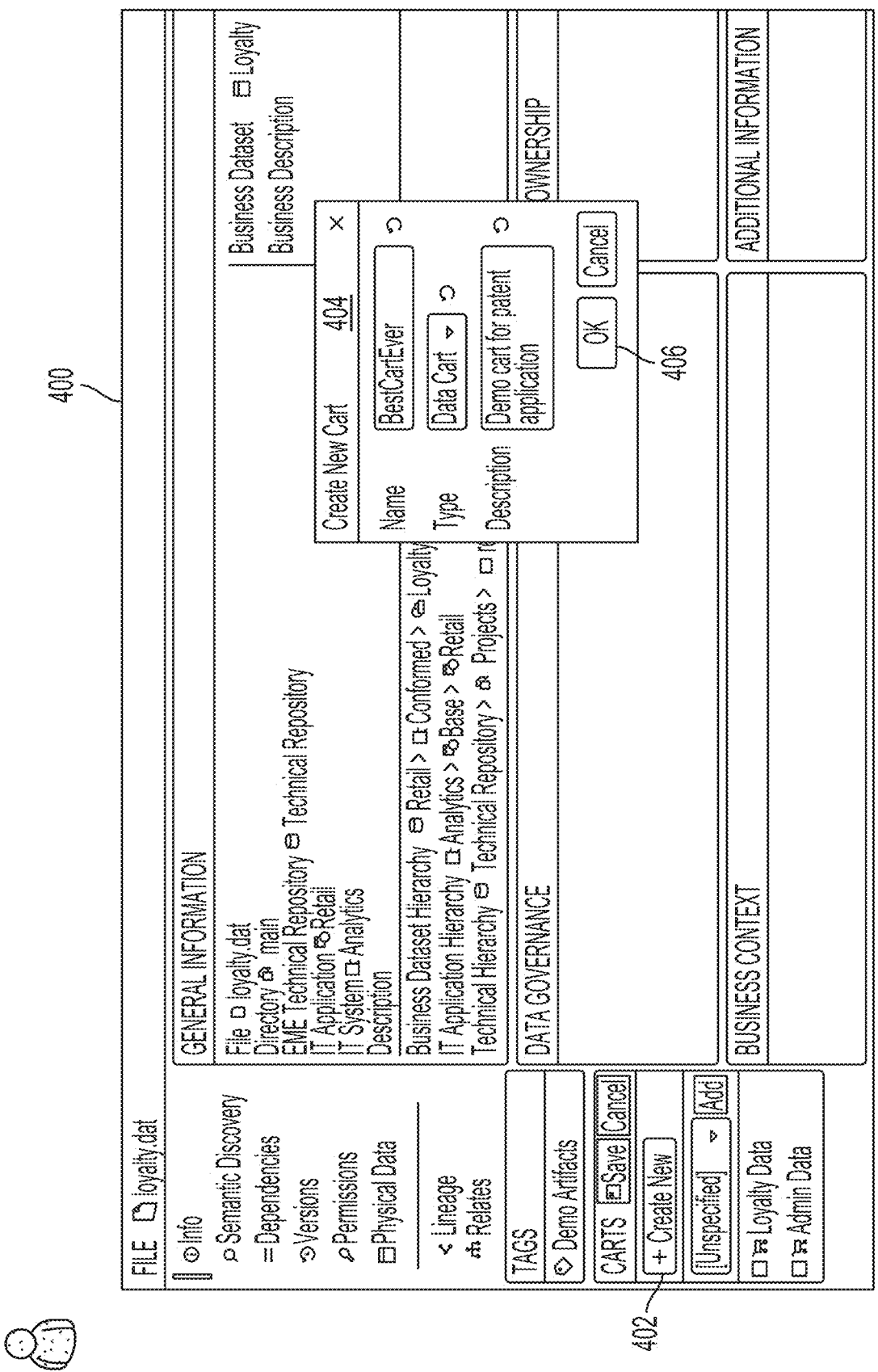
FIG. 8A is an illustration of an exemplary graphical user interface, rendered by a data processing system, through which a user may define a dataset cart.

FIG. 8A illustrates a GUI 400 in a state in which a new dataset cart may be created. For example, while viewing a user interface in which information about a dataset is displayed, a user, such as user 111*a* of FIG. 1A, may specify a dataset cart is to be created. In this example, a user may be viewing information about the "loyalty.dat" dataset and then want to create a new dataset cart that contains the "loyalty.dat" dataset. The user may select a graphical user element 402 to create the new dataset cart. Selection of graphical user element 402 may cause the system to generate a pop-up dialog box 404 where the user may name the cart (e.g., "BestCartEver"), indicate a type of entity being created (e.g., dataset cart), and provide a description for the dataset cart.

Selection of graphical user element 406 may cause the system to generate a new dataset cart that contains the "loyalty.dat" dataset. The system may store a representation of the newly created dataset cart. For example, an entry may be added to the repository 120 (FIG. 1C) to represent the dataset cart. In some instances, some or all of the characteristics of a dataset cart may initially be assigned with default values. For example, the dataset cart may initially be assigned a scope based on the persona of the user who created it. This might be achieved, for example, by setting the scope initially to allow the dataset cart to be visible only to its creator. Regardless of how the initial values for the characteristics are initially assigned, one or more users might subsequently change them. Once a record of the dataset cart is created, it might be edited, such as through a user interface as shown in FIG. 6 or 7.

Figure 8B:
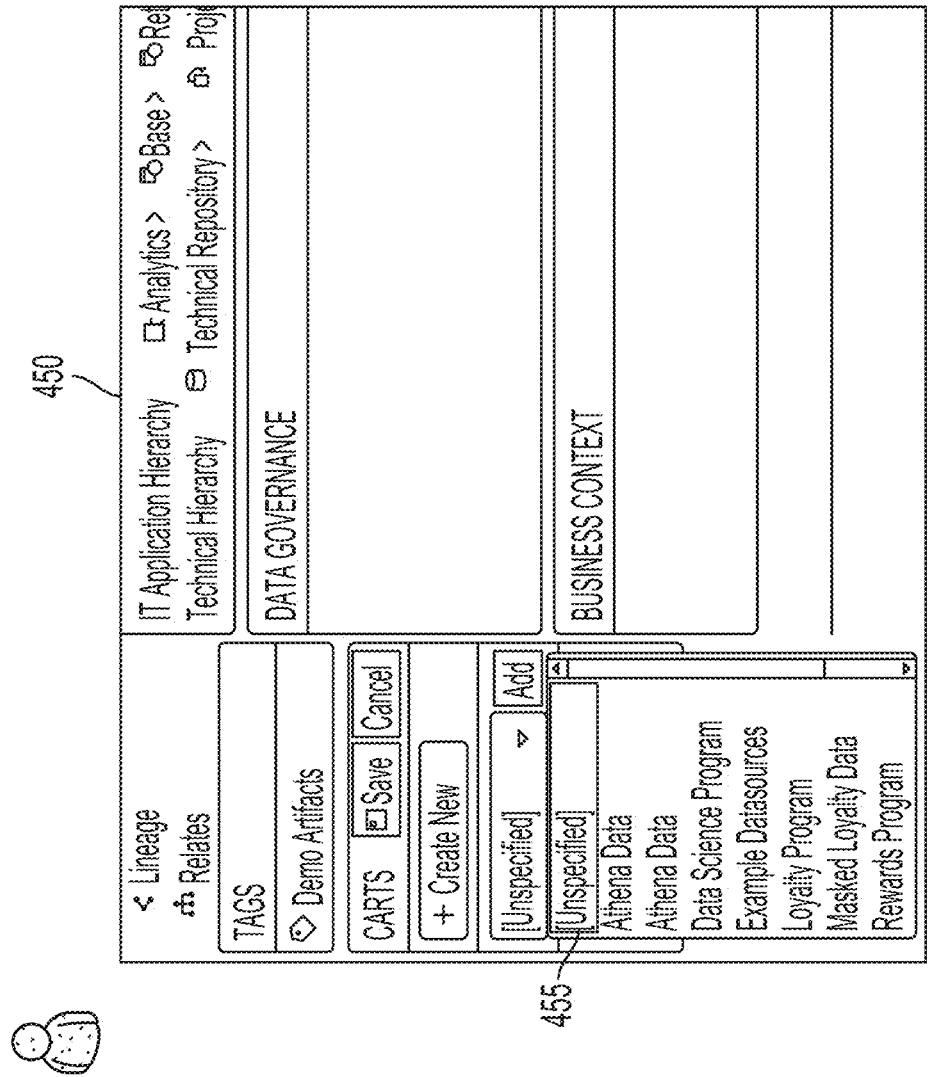
FIG. 8B is an illustration of an exemplary graphical user interface of FIG. 8A in a different operating state in which a user may select datasets for inclusion in a dataset cart.

Alternatively, dataset carts, once created might be updated in other ways. For example, rather than create a new dataset cart to hold a dataset, a user may wish to add a dataset to an existing dataset cart. FIG. 8B illustrates a portion 450 of GUI 400 in which a user, such as user 111*a* of FIG. 1A, may opt to add the "loyalty.dat" dataset to an existing dataset cart. For example, drop-down menu 455 is a user interface element that, when selected by a user, presents a listing of existing dataset carts defined in the data processing system. In embodiments in which a dataset cart has a scope, the list may be limited to dataset carts with a scope that includes the user at the time. Selection of a particular dataset cart from the list may cause the dataset to be added to the selected dataset cart. The system may accordingly update the stored representation of the selected dataset cart.

Figure 12:
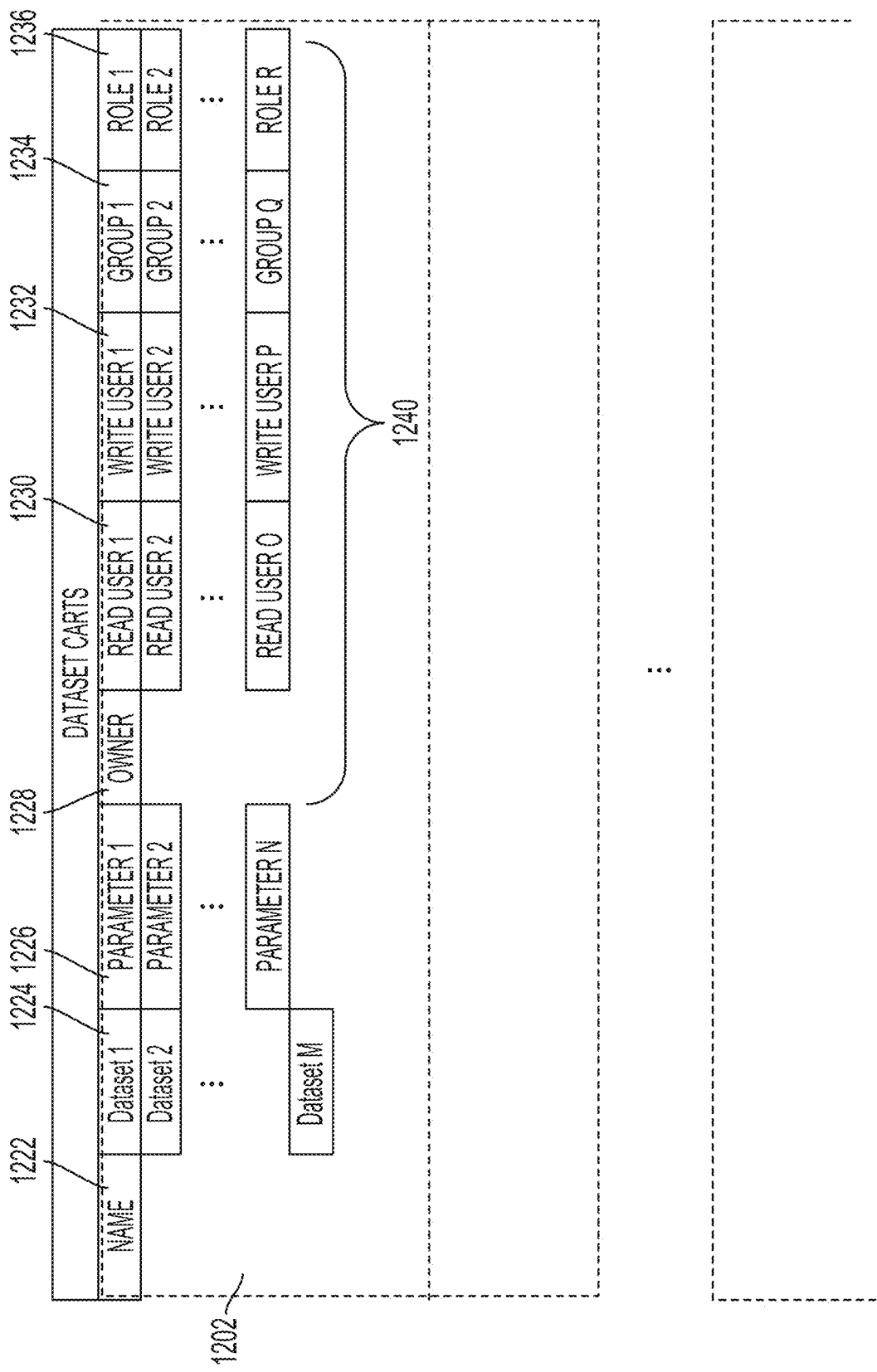
FIG. 12 is a block diagram of an illustrative data structure holding information about groups of datasets in accordance with an aspect of a data processing system.

FIG. 12 illustrates an example data structure that holds the stored representation of (i.e., stores information regarding) dataset carts. For each dataset cart, various pieces of information may be stored. Repository 120 (FIG. 1C), for example, may have such a data structure for each dataset cart. As shown in FIG. 12, a data structure 1202 for a dataset cart may include multiple fields containing information such as: a name field 1222 of the dataset cart, identifiers of the list 1224 of datasets contained in the dataset cart, and one or more parameters 1226 associated with the dataset cart. Here parameters 1226 indicate other information that may be stored, such as text describing the dataset cart, values of one or more tags or information of other types as described herein or otherwise used in connection with a dataset cart. In embodiments in which grouping of datasets may be hierarchical, list 1224 may contain further dataset groups instead of or in addition to other datasets.

Access information 1240 may also be stored with information about the dataset cart. This access information may indicate users that have privileges to access stored information about the dataset cart. This information may include an owner 1228 of the dataset cart, a list 1230 of users authorized to read the information about the dataset cart or a list 1232 of users authorized to modify the information about the dataset cart. Some or all of this authorization information may be processed by other components of the data processing system to establish the scope for the dataset cart. Other information alternatively or additionally may be included to establish the scope. List 1234, for example, may define groups within the scope of the dataset cart. List 1236 may define roles of users authorized to access the dataset cart.

A data processing system may provide multiple user interfaces in which datasets and or dataset groups are indicated. Each of these interfaces may be configured to enable a user to manage dataset groups, such as by creating a new dataset group or add a dataset to a dataset group. User operation of these interfaces may change the collection of dataset groups available in a data processing system, which may be implemented such as by adding, deleting or changing data structures such as 1202.

Figure 9:
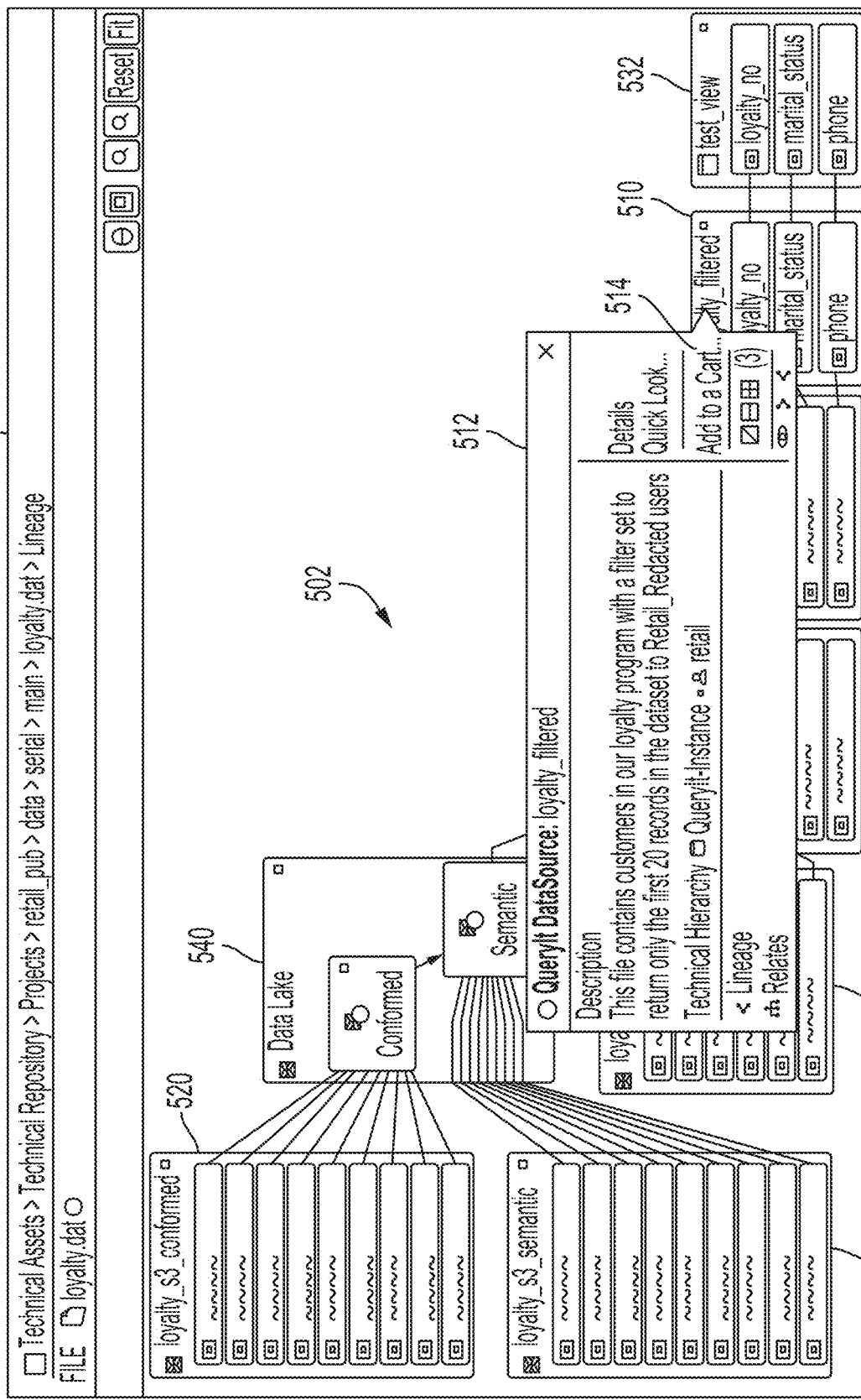
FIG. 9 is an illustration of an exemplary graphical user interface, rendered by a data processing system, through which a user may designate a dataset for inclusion in a dataset cart.

FIG. 9 illustrates a GUI 500 through which a user, such as user 111a of FIG. 1A, may designate a dataset for inclusion in a dataset cart. GUI 500 displays lineage information associated with a dataset. A data processing system may present such information for any of multiple reasons which need not be related to the management of dataset groups. For example, displaying technical lineage may enable a user to explore possible sources of error identified in the data in a dataset. Displaying business lineage may enable a user to identify groups within an enterprise that may be impacted by a change to a dataset. Regardless of why lineage information is displayed, a user reviewing such information may identify a need to manage one or more dataset groups, such that integrating user interface elements that enable dataset group management with a lineage user interface may facilitate efficient operation.

For example, GUI 500 is shown displaying lineage information 502 for the "loyalty.dat" dataset. One or more components representing datasets in the displayed lineage information may be selected and manipulated to specify the datasets represented by those components be included in a dataset cart. In this example, selection of component 510 may result in the display of window 512 through which the user may select a graphical user interface element 514, that, when invoked, adds the dataset "loyalty_filtered" to an existing dataset cart (as shown in FIG. 8B) or a newly created dataset cart (as shown in FIG. 8A).

Datasets for inclusion in a dataset cart may be selected by a user, such as user 111a of FIG. 1A, via a search GUI, such as GUI 600 illustrated in FIGS. 10A . . . 10C. The data processing system may include a dataset search interface that includes a rich combination of search criteria. That user interface may be presented in response to a request to create a new dataset cart or, after identifying one or more datasets through such a search, a user may specify that certain datasets returned in search results be used in managing dataset carts.

Through a search interface, the system may identify datasets that are available for use in performing an operation relating to data access with the data processing system 104. In some implementations, the search GUI 600 may include graphical user interface elements 602, 604, 606, 608 for a user to input a search query. User interface element 602 for example, may be a text field in which search results are limited to datasets have a name, a field, and/or other associated metadata including the text entered.

A user may enter other inputs through other user interface elements to define a faceted query. In such a query, the user may specify one or more values of facets that describe datasets defined in the data processing system. A user interface element may be provided for each facet through which a user may indicate values stored in the metadata associated with datasets defined in the data processing system. The range of values may be limited to values for the datasets meeting criteria already specified in the search interface. User interface elements 604, 606 and 608 are examples of user interface elements through which a user may specify a value for a facet. For example, the one or more facets may correspond to properties of the datasets, such as, type, owner, hierarchies, whether a dataset is registered in a catalog associating information for accessing a physical dataset to a logical dataset, and/or other properties.

Other information may alternatively or additionally be input through such a user interface to define a search query.

The data processing system may execute a search based on the query and generate search results including a list 610 of datasets selected by the data processing system based on the query. The faceted query may include one or more facets based on which the search results may be filtered. In the illustrated example, the list 610 of datasets presented in GUI 600 includes all datasets including "loyalty" in the name, in a field name or in a description of the dataset. Additional facets are shown to have been specified to further filter the search results. Selection of a facet may cause the search results to be filtered according to the facet.

Figure 10B:
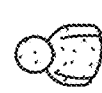
FIG. 10B is an illustration of the exemplary graphical user interface of FIG. 10A, in an operating state in which a user has specified additional search criteria to limit search results to datasets registered with a dataset catalog.

For example, if the facet 606 indicating whether a dataset is registered in a catalog associating information for accessing a physical dataset to a logical dataset is selected, the search results are filtered such that only datasets that are registered in the catalog are presented to the user in the GUI, as shown in the example of FIG. 10B. As shown in FIG. 10B, GUI 600 presents an updated list of datasets 615 that does not include some items, such as items 620, 625 from list 610.

A user may then select one or more of the presented datasets for inclusion in a dataset cart. A dataset cart may be created based on the selected datasets. For example, as shown in FIG. 10C, a user may select, from the list of datasets 615, a dataset "loyalty.dat" for inclusion in a dataset cart. In this example, the input indicating inclusion in a dataset cart is made in multiple steps. The dataset name in the list 615, for example, may form a user interface element 630. Selection of user interface element 630 may open a window 632 with information about the dataset associated with element 630. Window 632 may include a further "Add to a Cart" user interface element, selection of which may open a window 634 containing further user interface elements. The user interface elements in window 634 may enable a user to specify an existing dataset cart, similar to the selection described in connection with FIG. 8B, or to create a new dataset cart to which the selected dataset is added, similar to the process described in connection with FIG. 8A.

Where a dataset is a logical dataset, the data processing system may identify a physical dataset corresponding to the logical dataset and include information regarding the physical dataset in the dataset cart.

The created dataset carts may be available for use in a program. In some instances, a program may be an application executed by the data processing system. In other instances, a program may be a utility of the data processing system, such as, a data analytics utility configured to perform data quality analysis.

Figure 11:
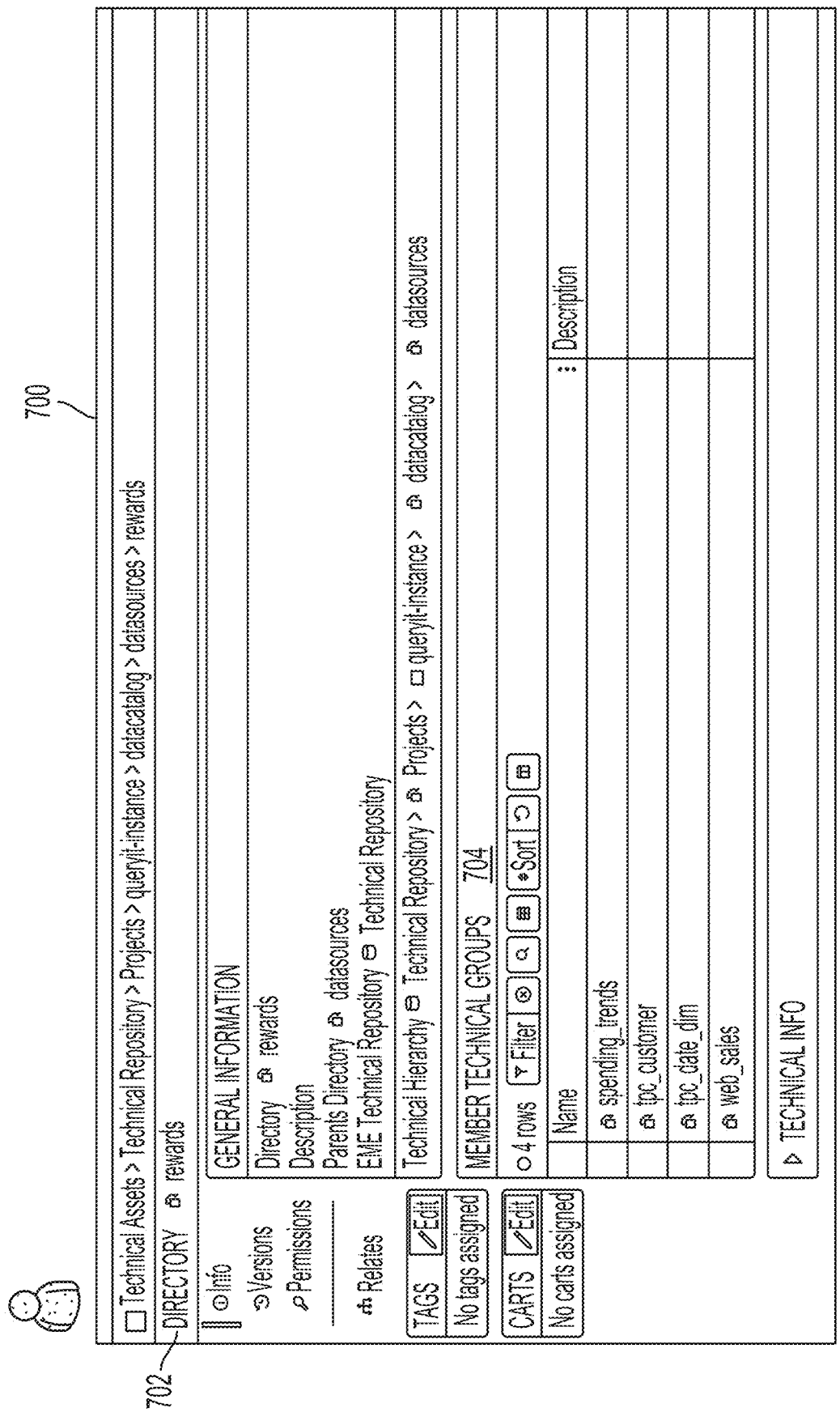
FIG. 11 is an illustration of an exemplary graphical user interface, rendered by a data processing system, through which a user may view or change information related to a groups of datasets, here identified as technical groups.

FIG. 11 is an illustration of an exemplary graphical user interface 700, rendered by a data processing system, through which a user, such as user 111a of FIG. 1A, may view or change information related to groups of datasets, here identified as technical groups. In a system in which groupings of datasets are hierarchical, the top-level grouping may be identified by a different name than used in lower level groupings. The top-level grouping, for example, may be referred to as dataset carts. Lower level groupings may have a different name, such as technical groups. For example, FIG. 11 illustrates that the "rewards" directory 702 is a member of technical groups 704 named "spending_trends", "tpc_customer", "tpc_date_dim", and "web_sales". Some or all of the operations described herein for managing dataset carts may be performed to manage technical groupings. With this dichotomy, technical groups may be included in dataset carts but not vice versa. However, there is no requirement that a hierarchical system have such a restriction.

Figure 13:
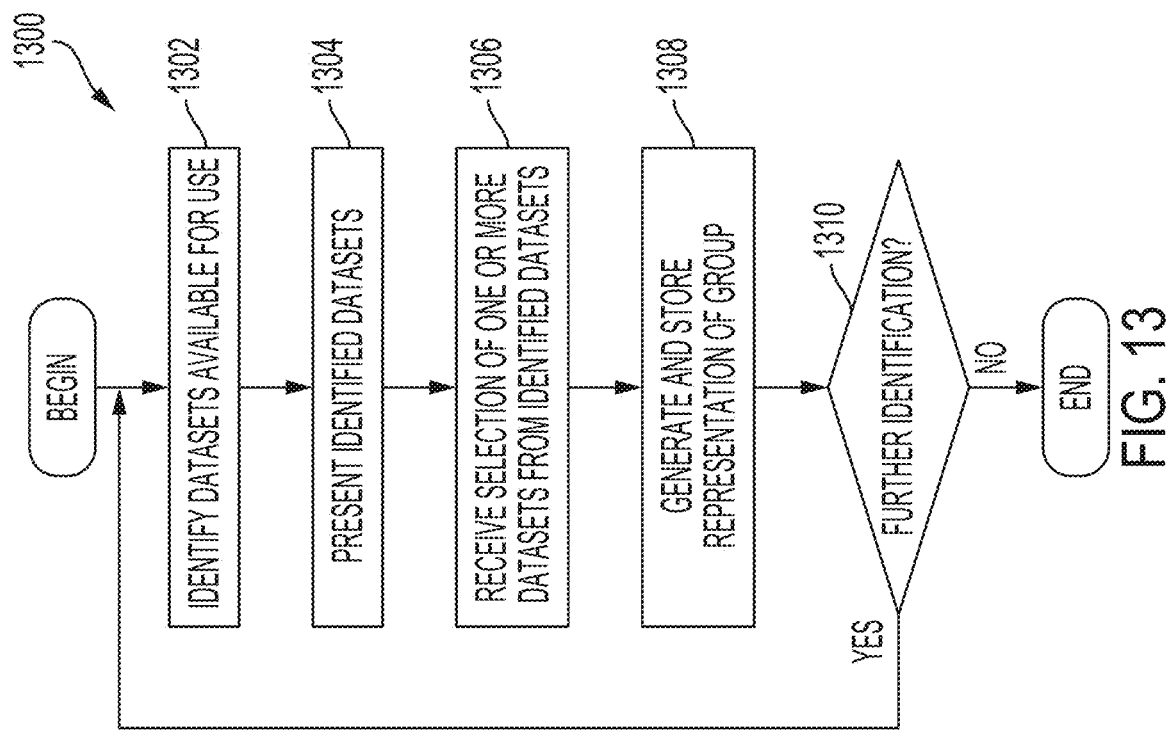
FIG. 13 is a flowchart of an exemplary method of operating a data processing system operable with a plurality of datasets according to an aspect of the technology described herein.

Representative Methods of Operation of a Data Processing System that Supports Groups of Logical Datasets FIG. 13 is a flowchart of an illustrative process 1300 for operating a data processing system operable with a plurality of datasets. Process 1300 may be executed by data processing system 104 described with reference to FIG. 1C. Process 1300 may alternatively or additionally include other acts, including acts as described elsewhere herein in connection with other embodiments.

At act 1302, process 1300 may identify datasets that are available for use in performing an operation relating to data access with the data processing system 104. For example, datasets may be identified by executing a search based on a search query specified via GUI 600 as shown in FIG. 10A.

Process 1300 may proceed to act 1304, during which the identified datasets may be presented in a user interface, such as GUI 600 of FIG. 10B. For example, FIG. 10B depicts some of the search results generated in response to execution of a search query including the keyword "loyalty" and a facet indicating whether a dataset is registered in a catalog associating information for accessing a physical dataset to a logical dataset.

Process 1300 may proceed to act 1306, during which a selection of one or more datasets from the identified datasets may be received. A user may select one or more of the identified datasets for inclusion in a group, such as, a dataset cart. For example, as shown in FIG. 10C, a user may select, from the identified datasets, a dataset "loyalty.dat" for inclusion in a dataset cart. The dataset may be selected for inclusion in a new dataset cart or an existing dataset cart.

Process 1300 may proceed to act 1308, during which a representation of a group comprising the selected one or more datasets may be generated and stored. Such a representation is depicted in FIG. 12 and includes various pieces of information, such as a name of the group, information regarding datasets contained in the group, parameters associated with datasets in the group, an owner of the group, and/or scope information associated with the group.

Process 1300 may proceed to act 1310, during which a determination may be made regarding whether to perform further identification of datasets. For example, a user may specify additional or different facets for the search query. In response, a different set of datasets may be identified at act 1302, for example. A dataset may be selected from the different set of datasets resulting in generation of a new representation of a group or an update to an existing representation of a group.

Figure 14:
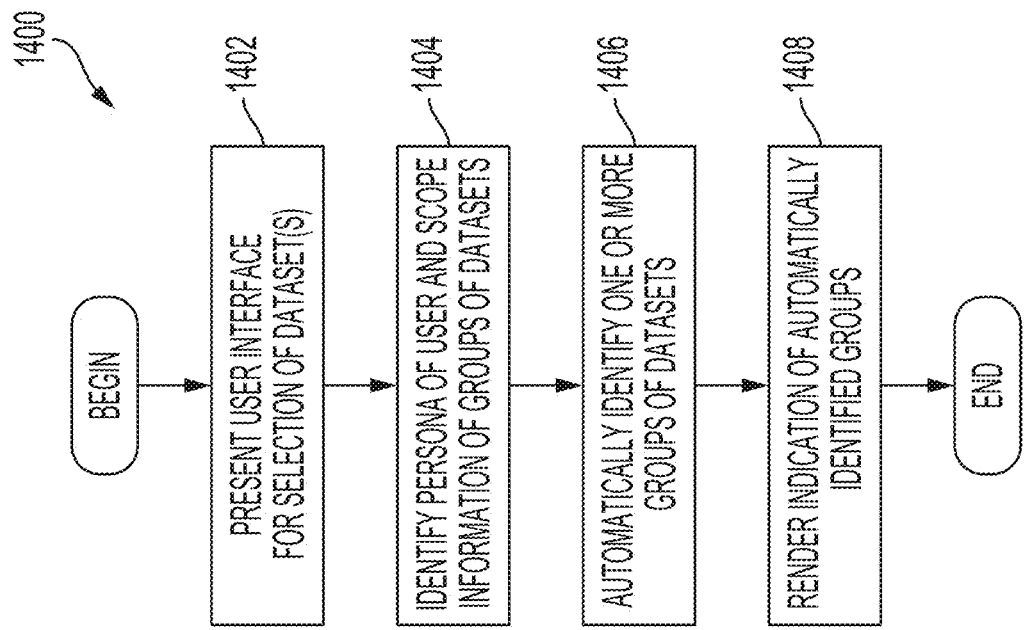
FIG. 14 is a flowchart of an exemplary method for operating a data processing system configured to execute operations that access datasets according to an aspect of the technology described herein.

FIG. 14 is a flowchart of an illustrative process 1400 for operating a data processing system configured to execute operations that access datasets. Process 1400 may be executed by data processing system 104 described with reference to FIG. 1C. Process 1400 may alternatively or additionally include other acts, including acts as described elsewhere herein in connection with other embodiments.

At act 1402, process 1400 may present a user interface configured for selection by a user of one or more datasets or dataset carts for use in conjunction with an operation relating to data access with the data processing system. Examples of such user interfaces are shown in FIGS. 2B and 2E.

Process 1400 may proceed to act 1404, during which a persona associated with a user of the data processing system (e.g., a user requesting a search for a dataset) may be identified and scope information associated with datasets and/or groups of datasets (e.g., dataset carts) may be identified. The scope information associated with the datasets and/or groups of datasets may be defined based on personas of users of the data processing system and/or other parameters.

Process may proceed to act 1406, during which one or more groups of datasets may be automatically identified based at least in part on a correspondence between the persona of the user and the scope information associated with the automatically identified groups of datasets. For example, FIGS. 2B and 2E depict listings 815, 895 of datasets and/or dataset carts that may be generated by checking personal characteristics (e.g., permissions) of the user requesting a search for a dataset and the result set may be limited to only dataset carts and/or datasets with a scope encompassing that user's personal characteristics.

Process may proceed to act 1408, during which an indication of the automatically identified groups of datasets may be rendered via the user interface. For example, when a user selects a particular dataset cart in FIG. 8E, an indication of the selected dataset cart may be rendered in the second portion 860 of the user interface.

Figure 15:
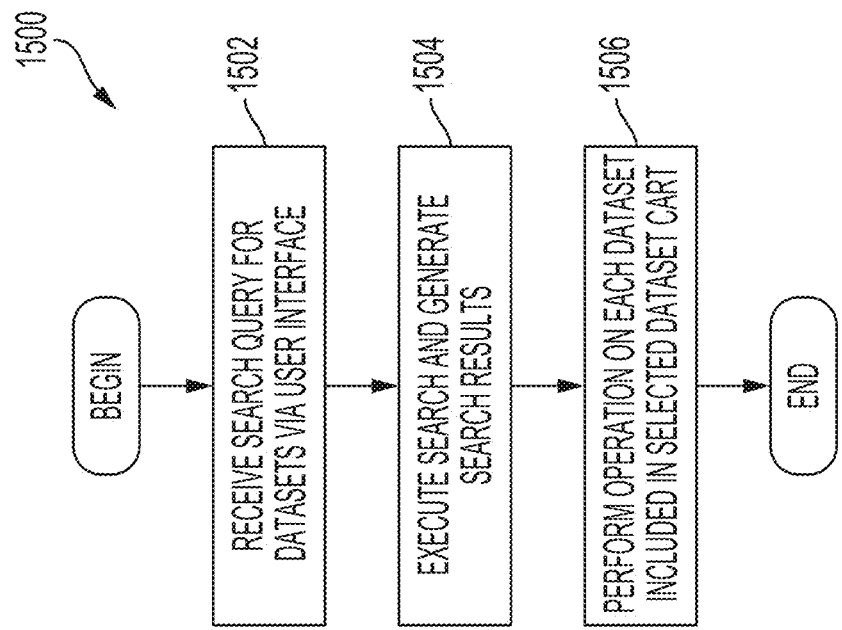
FIG. 15 is a flowchart of an exemplary method for operating a data processing system configured to execute programs for accessing datasets according to an aspect of the technology described herein.

FIG. 15 is a flowchart of an illustrative process 1500 for operating a data processing system configured to execute programs for accessing datasets. Process 1500 may be executed by data processing system 104 described with reference to FIG. 1C. Process 1500 may alternatively or additionally include other acts, including acts as described elsewhere herein in connection with other embodiments.

At act 1502, process 1500 may receive, via a user interface, a search query for datasets for use in in conjunction with an operation relating to data access with the data processing system. An example of such a user interface is shown in FIG. 4A.

Process 1500 may proceed to act 1504, during which a search may be executed based on the search query to generate search results. The search results may be presented in the user interface and include one or more dataset carts. At least some of the dataset carts may each include one or more of the searched datasets. The datasets and/or dataset carts presented in the user interface may be identified by checking personal characteristics (e.g., permissions) of the user requesting the search for a dataset and the result set may be limited to only dataset carts and/or datasets with a scope encompassing that user's personal characteristics.

Process 1500 may proceed to act 1506, during which, upon selection of a dataset cart in the user interface, the operation may be performed on each dataset included in the dataset cart. The user interface may provide an option for selecting the dataset cart as a target for the operation.

Additional Implementation Detail

Figure 16:
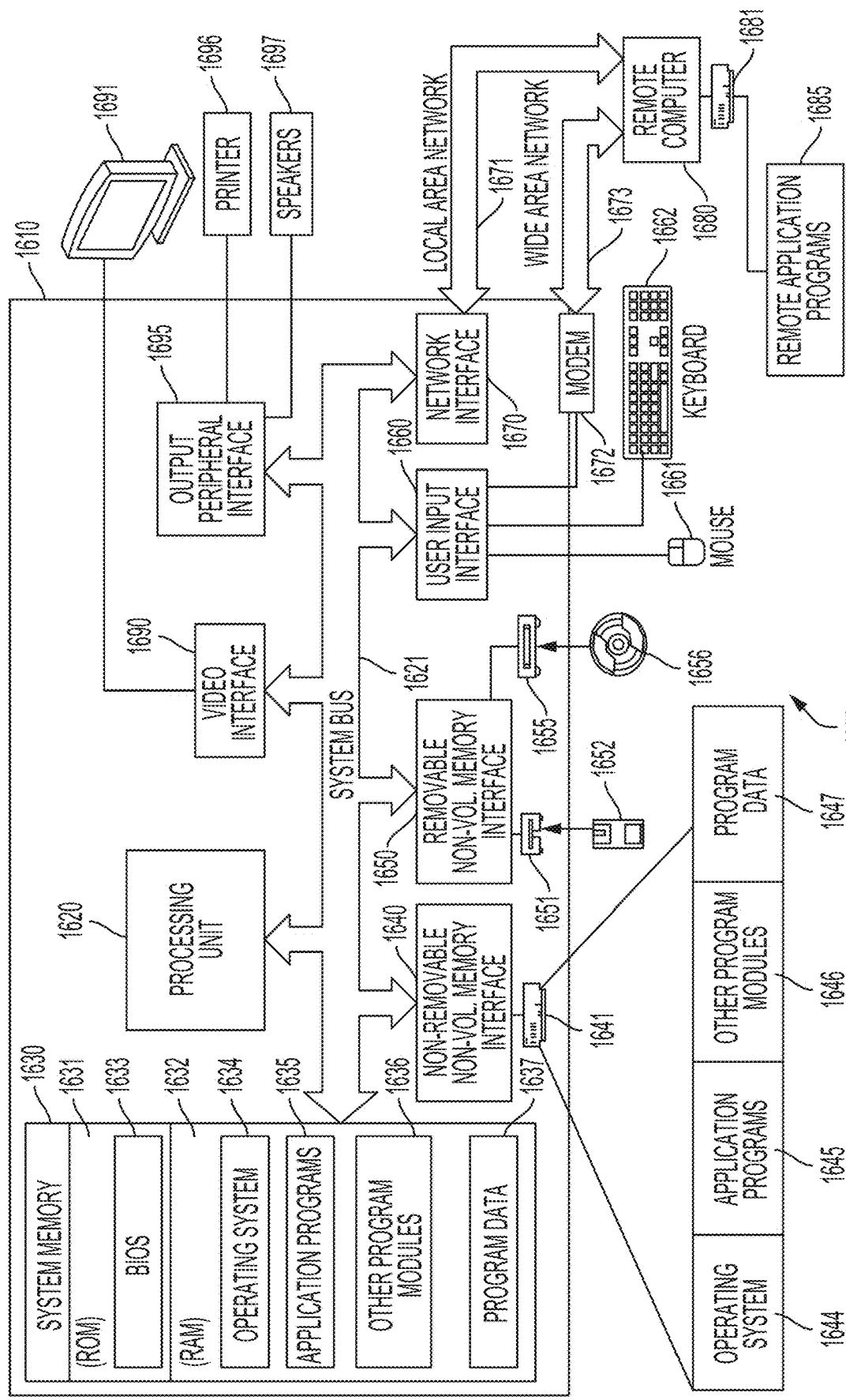
FIG. 16 is a block diagram of an illustrative computing system environment that may be used in implementing some aspects of the technology described herein.

FIG. 16 illustrates an example of a suitable computing system environment 1600 on which the technology described herein may be implemented. The computing system environment 1600 is only one example of a suitable computing environment and is not intended to suggest any limitation as to the scope of use or functionality of the technology described herein. Neither should the computing environment 900 be interpreted as having any dependency or requirement relating to any one or combination of components illustrated in the exemplary operating environment 900.

The technology described herein is operational with numerous other general purpose or special purpose computing system environments or configurations. Examples of well-known computing systems, environments, and/or configurations that may be suitable for use with the technology described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The technology described herein may also be practiced in distributed computing environments where tasks are performed by remote processing devices that are linked through a communications network. In a distributed computing environment, program modules may be located in both local and remote computer storage media including memory storage devices.

With reference to FIG. 16, an exemplary system for implementing the technology described herein includes a general purpose computing device in the form of a computer 1610. Components of computer 1610 may include, but are not limited to, a processing unit 1620, a system memory 1630, and a system bus 1621 that couples various system components including the system memory to the processing unit 1620. The system bus 1621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1610 typically includes a variety of computer readable media. Computer readable media can be any available media that can be accessed by computer 1610 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 1610. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 1630 includes computer storage media in the form of volatile and/or nonvolatile memory such as read only memory (ROM) 1631 and random access memory (RAM) 1632. A basic input/output system 1633 (BIOS), containing the basic routines that help to transfer information between elements within computer 1610, such as during start-up, is typically stored in ROM 1631. RAM 1632 typically contains data and/or program modules that are immediately accessible to and/or presently being operated on by processing unit 1620. By way of example, and not limitation, FIG. 16 illustrates operating system 1634, application programs 1635, other program modules 1636, and program data 1637.

The computer 1610 may also include other removable/non-removable, volatile/nonvolatile computer storage media. By way of example only, FIG. 16 illustrates a hard disk drive 1641 that reads from or writes to non-removable, nonvolatile magnetic media, a flash drive 1651 that reads from or writes to a removable, nonvolatile memory 1652 such as flash memory, and an optical disk drive 1655 that reads from or writes to a removable, nonvolatile optical disk 1656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1641 is typically connected to the system bus 1621 through a non-removable memory interface such as interface 1640, and magnetic disk drive 1651 and optical disk drive 1655 are typically connected to the system bus 1621 by a removable memory interface, such as interface 1650.

The drives and their associated computer storage media described above and illustrated in FIG. 16, provide storage of computer readable instructions, data structures, program modules and other data for the computer 1610. In FIG. 16, for example, hard disk drive 1641 is illustrated as storing operating system 1644, application programs 1645, other program modules 1646, and program data 1647. Note that these components can either be the same as or different from operating system 1634, application programs 1635, other program modules 1636, and program data 1637. Operating system 1644, application programs 1645, other program modules 1646, and program data 1647 are given different numbers here to illustrate that, at a minimum, they are different copies. An actor may enter commands and information into the computer 1610 through input devices such as a keyboard 1662 and pointing device 1661, commonly referred to as a mouse, trackball or touch pad. Other input devices (not shown) may include a microphone, joystick, game pad, satellite dish, scanner, or the like. These and other input devices are often connected to the processing unit 1620 through a user input interface 1660 that is coupled to the system bus, but may be connected by other interface and bus structures, such as a parallel port, game port or a universal serial bus (USB). A monitor 1691 or other type of display device is also connected to the system bus 1621 via an interface, such as a video interface 1690. In addition to the monitor, computers may also include other peripheral output devices such as speakers 1697 and printer 1696, which may be connected through an output peripheral interface 1695.

The computer 1610 may operate in a networked environment using logical connections to one or more remote computers, such as a remote computer 1680. The remote computer 1680 may be a personal computer, a server, a router, a network PC, a peer device or other common network node, and typically includes many or all of the elements described above relative to the computer 1610, although only a memory storage device 1681 has been illustrated in FIG. 16. The logical connections depicted in FIG. 16 include a local area network (LAN) 1671 and a wide area network (WAN) 1673, but may also include other networks. Such networking environments are commonplace in offices, enterprise-wide computer networks, intranets and the Internet.

When used in a LAN networking environment, the computer 1610 is connected to the LAN 1671 through a network interface or adapter 1670. When used in a WAN networking environment, the computer 1610 typically includes a modem 1672 or other means for establishing communications over the WAN 1673, such as the Internet. The modem 1672, which may be internal or external, may be connected to the system bus 1621 via the actor input interface 1660, or other appropriate mechanism. In a networked environment, program modules depicted relative to the computer 1610, or portions thereof, may be stored in the remote memory storage device. By way of example, and not limitation, FIG. 16 illustrates remote application programs 1685 as residing on memory device 1681. It will be appreciated that the network connections shown are exemplary and other means of establishing a communications link between the computers may be used.

The techniques described herein may be implemented in any of numerous ways, as the techniques are not limited to any particular manner of implementation. Examples of details of implementation are provided herein solely for illustrative purposes. Furthermore, the techniques disclosed herein may be used individually or in any suitable combination, as aspects of the technology described herein are not limited to the use of any particular technique or combination of techniques.

Having thus described several aspects of the technology described herein, it is to be appreciated that various alterations, modifications, and improvements are possible.

For example, examples were provided in which a dataset group contains multiple datasets. A data processing system as described herein may be implemented to, in some scenarios, support a group with a single dataset and/or, in other scenarios, support a null group with no datasets.

As another example, examples are provided in which dataset groups are included in a result set from which a user may make a selection. A user may select a dataset group, following which the contents of the dataset group may be presented to the user for a further selection. Scenarios are described in which the user selects a dataset contained within that dataset group. In some scenarios, the dataset group may contain other dataset groups. Selecting a dataset group contained within the group may result in a repeat of the process in which the contents of the selected dataset group are presented to a user for selection from among the contents of that dataset group. Such a recursive process may be repeated recursively to any number of levels.

Further, examples are provided in which a dataset selection tool receives user input to specify only a single dataset by stepping through one or more screens of the user interface until the user arrives at a screen in which the desired dataset is presented. In variations on data processing systems as described herein, the user may navigate through user interface screens and select multiple datasets, where the selection tool is used in an operation in which multiple datasets are specified.

Further, dataset carts are described as having a scope based on persona of users. Other characteristics that might be evaluated at time of use might be used to define scope. Time, for example, might be used for scope. Scoping dataset groups based on day of the week, for example, may result in access to datasets that are updated on certain days of the week being returned in searches on days that they are up to date.

As yet another example, scope was described as limiting the number and enhancing the relevance of dataset groups returned in response to a search query. In some embodiments, a scope may be attached to a dataset individually, such that the datasets returned in response to a search query are limited based on scope at the time of the search.

As yet another example, dataset groups are described as having scopes. The scope may be implemented by storing and accessing scope information associated with the dataset groups. In a data processing system, components, not necessarily limited to dataset groups, may be given scope. For example, certain tools may be scoped, limiting their use to users with personas within the scope. In such an embodiment, the scope information for the dataset group may be set and used in the same manner as scope information for other components.

As yet another variation, results of a search for a dataset may be limited to dataset carts that themselves match the search query or contain datasets matching the search criteria. In some embodiments, the search results may include dataset carts including datasets matching the criteria and datasets that match the search criteria and are not assigned to any dataset cart. Though individual datasets may be presented, the search results may be limited by presenting datasets hierarchically, such that datasets subsumed within a dataset cart or other grouping are not shown individually.

Further, examples were provided in which user input specified a source type, which could differentiate between a context in which a selection should be a single dataset or a group of datasets. This context may be determined in other ways, including automatically. If context is determined automatically, it may be based on a computerized analysis of the operation that is to be performed on the selected dataset or datasets.

As a further example of possible variations of the disclosed embodiments, it is described that a user writes applications that specify access to logical datasets. In some embodiments, the user may be a human user. In other embodiments, the user may be a program with artificial intelligence (an AI). The AI, for example, may derive data processing algorithms by processing a data set which may then be applied to other datasets.

Such alterations, modifications, and improvements are intended to be part of this disclosure, and are intended to be within the spirit and scope of disclosure. Further, though advantages of the technology described herein are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

The above-described aspects of the technology described herein can be implemented in any of numerous ways. For example, the aspects may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. However, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, aspects of the technology described herein may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments described above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the technology as described above. As used herein, the term "computer-readable storage medium" encompasses only a non-transitory computer-readable medium that can be considered to be a manufacture (i.e., article of manufacture) or a machine. Alternatively or additionally, aspects of the technology described herein may be embodied as a computer readable medium other than a computer-readable storage medium, such as a propagating signal.

The terms "program" or "software" are used herein in a generic sense to refer to any type of computer code or set of computer-executable instructions or processor-executable instructions that can be employed to program a computer or other processor to implement various aspects of the technology as described above. Additionally, it should be appreciated that according to one aspect of this embodiment, one or more computer programs that when executed perform methods of the technology described herein need not reside on a single computer or processor, but may be distributed in a modular fashion amongst a number of different computers or processors to implement various aspects of the technology described herein.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the technology described herein may be used alone, in combination, or in a variety of arrangements not specifically described in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the technology described herein may be embodied as a method, of which examples are provided herein including with reference to FIGS. 13-15. The acts performed as part of any of the methods may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by an "actor" or a "user". It should be appreciated that an "actor" or a "user" need not be a single individual, and that in some embodiments, actions attributable to an "actor" or a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method for enabling efficient operation of a data processing system in an environment with multiple datasets by enabling a first user to form dataset groups and presenting dataset groups to a second user for selection in connection with configuring an operation that accesses one or more datasets, the method comprising:
   receiving input, from the first user through one or more first user interfaces, selecting one or more datasets of a plurality of datasets for association with a group of a plurality of groups of datasets;
   storing representations of the plurality of groups of datasets;
   presenting a second user interface configured for selection, by the second user, of one or more datasets for use in conjunction with the operation that accesses one or more datasets, wherein the second user has a persona and datasets have scopes based at least in part on persona of users, wherein presenting the second user interface comprises:
      automatically identifying one or more groups of datasets based at least in part on a correspondence between the persona associated with the second user of the data processing system and scopes associated with the one or more automatically identified groups of datasets; and
      rendering an indication of the one or more automatically identified groups of datasets in the second user interface.

2. The method of claim 1, wherein storing representations of the plurality of groups comprises:
   for each group of the plurality of groups of datasets, storing information regarding one or more users authorized to access the group.

3. The method of claim 1, wherein:
   the one or more first user interfaces comprise a dataset search interface comprising a faceted search interface; and
   facets in the faceted search interface are based on values of metadata associated with the plurality of datasets.

4. The method of claim 1, wherein the one or more first user interfaces comprise a user interface displaying lineage of a dataset.

5. The method of claim 1, wherein the one or more first user interfaces comprise a user interface displaying metadata related to a dataset of the plurality of datasets.

6. The method of claim 1, further comprising:
   receiving through the second user interface input from the second user specifying a group of the one or more automatically identified groups; and
   based on the received input from the second user, performing the operation for each of a plurality of datasets within the specified group.

7. The method of claim 1, wherein the operation comprises configuring an application for execution by the data processing system.

8. The method of claim 1, wherein automatically identifying one or more groups of datasets based at least in part on a correspondence between the persona associated with the second user of the data processing system and scopes associated with the one or more automatically identified groups of datasets comprises selecting one or more groups of datasets that the second user has permission to access.

9. The method of claim 1, wherein:
   rendering the indication of the one or more automatically identified groups comprises rendering a graphical user interface element indicative of a group of datasets for each of the one or more automatically identified groups; and
   the method further comprising receiving, via the second user interface, a selection of a rendered graphical user interface element indicative of a group of datasets and, based on the selection, rendering on the second user interface a plurality of datasets in the group.

10. A method for enabling efficient operation of a data processing system in an environment with multiple datasets by presenting dataset groups for selection by a user of the data processing system in connection with configuring an operation that accesses one or more datasets, the method comprising:
   presenting a user interface configured for selection by the user of one or more datasets for use in conjunction with the operation that accesses one or more datasets, wherein the user has a persona and datasets have scopes based at least in part on persona of users, wherein presenting the user interface comprises:
      automatically identifying one or more groups of datasets based at least in part on a correspondence between the persona associated with the user of the data processing system and scopes associated with the one or more automatically identified groups of datasets; and rendering an indication of the one or more automatically identified one or more groups of datasets in the user interface.

11. The method of claim 10, wherein the method further comprises:
receiving user input through the user interface specifying a group of the one or more automatically identified groups; and
based on the received input, rendering an indication of datasets within the specified group.

12. The method of claim 10, wherein the method further comprises:
receiving user input through the user interface specifying a group of the one or more automatically identified groups; and
based on the received input, performing the operation for each of a plurality of datasets within the specified group.

13. The method of claim 10, wherein:
automatically identifying one or more groups of datasets further comprises:
receiving, via the user interface, a search query for datasets;
executing a search based on the search query to generate search results.

14. The method of claim 10, wherein the operation comprises configuring an application for execution by the data processing system.

15. The method of claim 10, wherein automatically identifying one or more groups of datasets based at least in part on a correspondence between the persona associated with a user of the data processing system and scopes associated with the one or more automatically identified groups of datasets comprises selecting one or more groups of datasets that the user has permission to access.

16. The method of claim 10, wherein:
rendering the indication of the one or more automatically identified groups comprises rendering a graphical user interface element indicative of a group of datasets for each of the one or more automatically identified groups; and
the method further comprising receiving a selection of a rendered graphical user interface element indicative of a group of datasets and, based on the selection, rendering on the user interface a plurality of datasets in the group.

17. A method for enabling efficient operation of a data processing system in an environment with multiple datasets by enabling selection of a group of datasets for performing an operation on each of multiple datasets in the group the method comprising:
receiving, via a user interface, a search query to search for datasets for use in conjunction with an operation relating to data access with the data processing system;
presenting results of the search based on the search query in the user interface, wherein presenting the results comprises presenting one or more groups of datasets, at least some of the one or more groups of datasets each comprising one or more of the searched datasets;
receiving, via the user interface, a manipulation of a first group of datasets of the one or more groups of datasets presented in the user interface, wherein the user interface is configured to provide an option for selecting, via the user interface, the first group of datasets as a target of the operation relating to data access; and
upon selection of the first group of datasets of the one or more groups of datasets presented in the user interface, performing the operation on each of one or more datasets included in the first group of datasets.

18. The method of claim 17, wherein performing the operation on each of one or more datasets comprises executing data quality rules on each of the one or more datasets.

19. The method of claim 17, wherein the user interface provides an option for expanding the first group of datasets to enable selection, via the user interface, of one or multiple datasets of the first group of datasets as a target of the operation relating to data access, and
upon selection of the one or multiple datasets of the first group of datasets, performing the operation on each of the one or multiple datasets of the first group of datasets.

20. The method of claim 17, wherein each of the one or more groups of datasets presented in the user interface has correspondence between a persona associated with a user, who entered the search query via the user interface, and a scope associated with the one or more groups of datasets.

21. The method of claim 20, wherein the search results exclude datasets that do not have metadata associated with the persona of the user.

* * * * *